United States Patent
Shi

(10) Patent No.: US 12,048,021 B2
(45) Date of Patent: Jul. 23, 2024

(54) RANDOM ACCESS METHOD AND DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 283 days.

(21) Appl. No.: 17/477,048

(22) Filed: Sep. 16, 2021

(65) Prior Publication Data

US 2022/0007426 A1 Jan. 6, 2022

Related U.S. Application Data

(63) Continuation of application No. PCT/CN2019/079939, filed on Mar. 27, 2019.

(30) Foreign Application Priority Data

Mar. 19, 2019 (WO) ................. PCT/CN2019/078782
Mar. 19, 2019 (WO) ................. PCT/CN2019/078786
Mar. 19, 2019 (WO) ................. PCT/CN2019/078788

(51) Int. Cl.
*H04W 74/0833* (2024.01)
(52) U.S. Cl.
CPC .............................. *H04W 74/0833* (2013.01)
(58) Field of Classification Search
CPC ......... H04W 74/0833; H04W 74/0841; H04W 74/085; H04W 74/006; H04W 76/27
See application file for complete search history.

(56) References Cited

U.S. PATENT DOCUMENTS 10,070,400 B2   9/2018   Kim et al.
10,405,342 B2*  9/2019   Wang ................. H04W 74/006
(Continued)

FOREIGN PATENT DOCUMENTS

CN   101505538 A   8/2009
CN   101784121 A   7/2010
(Continued)

OTHER PUBLICATIONS

The EESR of corresponding European application No. 19920463.7, dated Jan. 26, 2022.
(Continued)

*Primary Examiner* — Ayaz R Sheikh
*Assistant Examiner* — Tarell A Hampton
(74) *Attorney, Agent, or Firm* — Ladas & Parry LLP

(57) ABSTRACT

The embodiments of the present application relate to random access method and device, the method including: sending, by a terminal device, a first message to a network device, where the first message includes a random access preamble and UL message, and the UL message includes a first identifier; determining, by the terminal device, a first target radio network temporary identifier RNTI used for blindly detecting a first physical downlink control channel PDCCH according to the first identifier; blindly detecting, by the terminal device, the first PDCCH according to the first target RNTI; determining, by the terminal device, whether a contention conflict in a random access procedure is resolved according to a blind detection result of the first PDCCH or a first physical downlink shared channel PDSCH scheduled by the first PDCCH.

20 Claims, 6 Drawing Sheets

(56) References Cited

U.S. PATENT DOCUMENTS

| | | | |
|---|---|---|---|
| 2012/0281640 A1* | 11/2012 | Xu | H04L 5/0048 370/329 |
| 2014/0126520 A1* | 5/2014 | Quan | H04W 74/0866 370/329 |
| 2016/0066255 A1 | 3/2016 | Marinier et al. | |
| 2016/0100425 A1 | 4/2016 | Dinan | |
| 2017/0099674 A1* | 4/2017 | Han | H04W 72/20 |
| 2017/0105197 A1 | 4/2017 | Fröberg Olsson et al. | |
| 2017/0105198 A1 | 4/2017 | Fu et al. | |
| 2018/0007709 A1 | 1/2018 | Seo et al. | |
| 2019/0053272 A1 | 2/2019 | Tsai | |
| 2019/0174554 A1 | 6/2019 | Deenoo et al. | |
| 2019/0215861 A1 | 7/2019 | Son | |
| 2019/0335515 A1 | 10/2019 | Chen et al. | |
| 2019/0349915 A1 | 11/2019 | Ahn et al. | |
| 2020/0045650 A1 | 2/2020 | Suzuki et al. | |
| 2020/0068616 A1 | 2/2020 | Qian et al. | |
| 2020/0100297 A1* | 3/2020 | Agiwal | H04W 74/0833 |
| 2020/0107372 A1* | 4/2020 | Agiwal | H04W 24/08 |
| 2020/0146069 A1* | 5/2020 | Chen | H04W 52/362 |
| 2020/0187242 A1 | 6/2020 | Höglund et al. | |
| 2020/0187266 A1 | 6/2020 | Lou et al. | |
| 2020/0288506 A1 | 9/2020 | Lei et al. | |
| 2020/0322948 A1* | 10/2020 | Xue | H04J 3/02 |
| 2021/0029746 A1* | 1/2021 | Turtinen | H04W 72/23 |
| 2021/0051472 A1* | 2/2021 | Shih | H04W 36/0005 |
| 2021/0168862 A1* | 6/2021 | Murray | H04W 74/0816 |
| 2021/0329703 A1* | 10/2021 | Yang | H04L 5/001 |
| 2021/0329704 A1 | 10/2021 | Yang et al. | |
| 2022/0070944 A1 | 3/2022 | Lin | |
| 2022/0124830 A1 | 4/2022 | Wu et al. | |

FOREIGN PATENT DOCUMENTS

| | | |
|---|---|---|
| CN | 102231917 A | 11/2011 |
| CN | 102548015 A | 7/2012 |
| CN | 102595634 A | 7/2012 |
| CN | 102821454 A | 12/2012 |
| CN | 102932917 A | 2/2013 |
| CN | 103220811 A | 7/2013 |
| CN | 107493608 A | 12/2017 |
| CN | 107872899 A | 4/2018 |
| CN | 108271275 A | 7/2018 |
| CN | 108282899 A | 7/2018 |
| CN | 108282901 A | 7/2018 |
| CN | 108282901 A1 | 7/2018 |
| CN | 108633009 A | 10/2018 |
| CN | 109391967 A | 2/2019 |
| CN | 109392188 A | 2/2019 |
| CN | 109479306 A | 3/2019 |
| EP | 3585112 A1 | 12/2019 |
| WO | 2013020494 A1 | 2/2013 |
| WO | 2018151230 A1 | 8/2018 |

OTHER PUBLICATIONS

Oppo:"2-steps RACH procedure for NR-U", 3GPP Draft; R2-1816263-2-Steps RACH Procedure for NR-U, 3rd Generation Partnership Project (3GPP), Mobile Competence Centre; 650, Route Des Lucioles; F-06921 Sophia-Antipolis Cedex; France, vol. RAN WG2, No. Spokane, USA; Nov. 12, 2018-Nov. 16, 2018 Nov. 12, 2018(Nov. 12, 2018), XP051555863.

Panasonic:"Discussion on 2-step RACH procedure", 3rd Generation Partnership Project (3GPP), Mobile Competence Centre; 650, Route Des Lucioles; F-06921 Sophia-Antipolis Cedex; France, Mar. 1, 2019(Mar. 1, 2019), pp. 1-4, XP051600090.

The EESR of corresponding European application No. 19920020.5, dated Feb. 8, 2022.

Samsung:"Procedure for Two-step RACH", 3GPP Draft; R1-1902242, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019 Feb. 15, 2019(Feb. 15, 2019), XP051599937.

Qualcomm Incorporated:"Report of Email Discussion [103#55][NR-U] 2-step RACH Model and Initial Information Contents(Qualcomm)", 3GPP Draft; R2-1815564_Report_Email_Discussion_NRU_2step, 3rd Generation Partnership Project (3GPP), Mobile Competence Centre; 650, Route Des Lucioles; F-06921 Sophia-Antipolis Cedex; France, vol. RAN WG2, No. Chengdu, China; Oct. 8, 2018-Oct. 12, 2018 Oct. 12, 2018(Oct. 12, 2018), XP051524883.

The Non-final rejection corresponding American U.S. Appl. No. 17/469,818 , dated Feb. 11, 2022.

The EESR of corresponding European application No. 19920380.3, dated Apr. 12, 2022.

ZTE et al:"R1-1901627; Considerations on 2-Step RACH Procedures", 3GPP Draft; R1-1901627, 3rd Generation Partnership Project (3GPP), Mobile Competence Centre; 650, Route Des Lucioles; F-06921 Sophia-Antipolis Cedex; France, Feb. 16, 2019(Feb. 16, 2019), pp. 1-11, XP051599324.

CATT:"Consideration on 2-Step RA", 3GPP Draft; R2-1700205 2-STEP RA, 3rd Generation Partnership Project (3GPP), Mobile Competence Centre; 650, Route Des Lucioles; F-06921 Sophia-Antipolis Cedex; France, vol. RAN WG2, No. Spokane, USA; Jan. 17, 2017-Jan. 19, 2017 Jan. 17, 2017(Jan. 17, 2017), XP051210789.

Huawei et al:"Two-step RACH procedure for NR-U", 3GPP Draft; R2-1816617 Two-Step RACH Provedure for NR-U, 3rd Generation Partnership Project (3GPP), Mobile Competence Centre; 650, Route Des Lucioles; F-06921 Sophia-Antipolis Cedex; France, vol. RAN WG2, No. Spokane, USA; Nov. 12, 2018-Nov. 16, 2018 Nov. 12, 2018(Nov. 12, 2018) XP051556187.

ZTE Corporation et al:"Msq2 payload xontents for 2-step RACH", 3GPP Draft; R2-1817064_R2, 3rd Generation Partnership Project (3GPP), Mobile Competence Centre; 650, Route Des Lucioles; F-06921 Sophia-Antipolis Cedex; France, Nov. 2, 2018(Nov. 2, 2018), pp. 1-9, XP051480988.

ZTE:"Summary of 7.2.1.1 Channel Structure for Two-step RACH", 3GPP Draft; R1-1903435, 3rd Generation Partnership Project (3GPP), Mobile Competence Centre; 650, Route Des Lucioles; F-06921 Sophia-Antipolis Cedex; France, Mar. 3, 2019(Mar. 3, 2019), pp. 1-28, XP051690819.

The Notice of Rejection of corresponding Chinese application No. 202111184645.1, dated Aug. 24, 2023.

The Notice of Rejection of corresponding Japanese application No. 2021-556595, dated Aug. 15, 2023.

The second Office Action of corresponding European application No. 19920380.3, dated Jul. 20, 2023.

The third Office Action of corresponding European application No. 19920463.7, dated Jul. 6, 2023.

Sony, Considerations on initial access procedures for NR unlicensed, R2-181817075, 3GPP TSG-RAN WG2 Meeting #103, Spokane, USA, Nov. 12-16, 2018.

3rd Generation Partnership Project; 3GPP TS 38.321 V15.8.0 (Dec. 2019); Technical Specification Group Radio Access Network; NR; Medium Access Control (MAC) protocol specification(Release 15).

The Non-final rejection corresponding American U.S. Appl. No. 17/469,818, dated Nov. 3, 2021.

Intel Corporation, Further consideration of 2-step CBRA. R2-1816697, 3GPP TSG-RAN WG2 meeting #104, Spokane, USA, Nov. 12-16, 2018.

Huawei, HiSilicon, Discussion on 2-step RACH Procedure, R2-167588, 3GPP TSG-RAN2 Meeting #96, Reno, USA, Nov. 14-18, 2016.

The first Office Action of corresponding European application No. 19920380.3, dated Feb. 6, 2023.

The first Office Action of corresponding Chinese application No. 202111184645.1, dated Jan. 19, 2023.

The first Office Action of corresponding Chinese application No. 202111344178.4, dated Jan. 9, 2023.

The first Office Action of corresponding Indian application No. 202127040784, dated Jan. 20, 2023.

The second Office Action of corresponding European application No. 19920463.7, dated Feb. 3, 2023.

The first Office Action of corresponding Japanese application No. 2021-556595, dated Feb. 17, 2023.

The first Office Action of corresponding Chinese application No. 202111305652.2, dated Nov. 18, 2022.

(56) References Cited

OTHER PUBLICATIONS

The second Office Action of corresponding Chinese application No. 202111184645.1, dated Apr. 19, 2023.
The second Office Action of corresponding European application No. 19920020.5, dated Apr. 13, 2023.
International Search Report (ISR) dated Dec. 20, 2019 for Application No. PCT/CN2019/079939.
International Search Report (ISR) dated Nov. 29, 2019 for Application No. PCT/CN2019/078786.
International Search Report (ISR) dated May 31, 2019 for Application No. PCT/CN2019/078782.
International Search Report (ISR) dated Dec. 11, 2019 for Application No. PCT/CN2019/078788.
ZTE, Sanechips:"Remaining details of RACH procedure",3GPP TSG RAN WG1 Meeting #90bis R1-1717036 Oct. 13, 2017.
Samsung:"NR 2-step random access procedure",3GPP TSG RAN WG1 NR Ad Hoc R1-1700892 Jan. 20, 2017.
The first Office Action of corresponding European application No. 19920463.7, dated Sep. 29, 2022.
The Final Rejection corresponding U.S. Appl. No. 17/469,818, dated Aug. 26, 2022.
The first Office Action of corresponding European application No. 19920020.5, dated Nov. 10, 2022.
The Advisory Action corresponding U.S. Appl. No. 17/469,818, dated Nov. 1, 2022.
The Non-final rejection corresponding U.S. Appl. No. 17/469,818, dated May 24, 2022.
The Non Final Rejection of corresponding U.S. Appl. No. 17/465,497, dated Oct. 6, 2023.
The Notice of Allowance of corresponding Chinese application No. 202111184645.1, dated Jan. 26, 2024.
The Reconsideration Report by Examiner before Appeal of corresponding Japanese application No. 2021-556595, dated Jan. 26, 2024.
The Final Rejection of corresponding U.S. Appl. No. 17/465,497, dated Apr. 18, 2024.

* cited by examiner

RANDOM ACCESS METHOD AND DEVICE

CROSS-REFERENCE TO RELATED APPLICATIONS

The present application is a continuation of International Application No. PCT/CN2019/079939, filed on Mar. 27, 2019, which claims priority to PCT application with application No. PCT/CN2019/078786 filed in China National Intellectual Property Administration on Mar. 19, 2019, and entitled "Wireless Communication Method. Terminal Device and Network Device", PCT application with application No. PCT/CN2019/078782 filed in China National Intellectual Property Administration on Mar. 19, 2019, and entitled "Method For Two-Step Random Access. Terminal Device and Network Device", and PCT application with application No. PCT/CN2019/078788 filed in China National Intellectual Property Administration on Mar. 19, 2019, and entitled "Random Access Method and Device". All of the aforementioned patent applications are hereby incorporated by reference in their entireties.

TECHNICAL FIELD

The present application relates to the field of communication, and in particular, to random access method and device.

BACKGROUND

A method for two-step random access procedure can be adopted in a new radio (NR) system (or called as 5G system, 5G network). In the two-step random access procedure, a message 1 (Msg 1) and a message 3 (Msg 3) in a four-step random access procedure can be sent as a first message (Msg A) in the two-step random access procedure, and a message 2 (Msg 2) and a message 4 (Msg 4) in a four-step random access procedure can be sent as a second message (Msg B) in the two-step random access procedure.

Since the first message can be shared by multiple terminal devices, a problem of conflict may occur. Therefore, how to solve a contention conflict in the two-step random access procedure is a problem needs to be solved.

SUMMARY

The embodiments of the present application provide random access method and device, capable of solving the contention conflict in the two-step random access procedure.

In a first aspect, a random access method is provided, the method including: sending, by a terminal device, a first message to a network device, where the first message includes a random access preamble and a UL (uplink) message, and the UL message includes a first identifier; determining, by the terminal device, a first target radio network temporary identifier RNTI used for blindly detecting a first physical downlink control channel PDCCH according to the first identifier; blindly detecting, by the terminal device, the first PDCCH according to the first target RNTI; determining, by the terminal device, whether a contention conflict in a random access procedure is solved according to a blind detection result on the first PDCCH or a first physical downlink shared channel PDSCH scheduled by the first PDCCH.

In a second aspect, a random access method is provided, the method including: receiving, by a network device, a first message sent by a terminal device, where the first message includes a preamble identifier ID of random access and a UL message, and the UL message includes a first identifier; decoding, by the network device, the first message; determining, by the network device, a response message to be sent to the terminal device according to a decoding situation of the first message.

In a third aspect, a terminal device is provided, configured to execute the method in the above first aspect or each of implementations thereof.

Specifically, the terminal device includes a functional module configured to execute the method in the above first aspect or each of implementations thereof.

In a fourth aspect, a network device is provided, configured to execute the method in the above second aspect or each of implementations thereof.

Specifically, the network device includes a functional module configured to execute the method in the above second aspect or each of implementations thereof.

In a fifth aspect, a terminal device is provided, including a processor and a memory. The memory is configured to store a computer program, and the processor is configured to call and run the computer program stored in the memory to execute the method in the above first aspect and each of implementations thereof.

In a sixth aspect, a network device is provided, including a processor and a memory. The memory is configured to store a computer program, and the processor is configured to call and run the computer program stored in the memory to execute the method in the above second aspect and each of implementations thereof.

In a seventh aspect, a chip is provided, configured to implement the method in any one aspect of the above first aspect to the above second aspect or each of implementations thereof.

Specifically, the chip includes: a processor, configured to call and run a computer program from a memory, causing a device installed with the chip to execute the method in any one aspect of the above first aspect to the above second aspect or each of implementations thereof.

In an eighth aspect, a computer-readable storage medium is provided, configured to store a computer program, the computer program causing a computer to execute the method in any one aspect of the above first aspect to the above second aspect or each of implementations thereof.

In a ninth aspect, a computer program product is provided, including a computer program instruction, the computer program instruction causing a computer to execute the method in any one aspect of the above first aspect to the above second aspect or each of implementations thereof.

In a tenth aspect, a computer program is provided, the computer program causing, when running on a computer, a computer to execute the method in any one aspect of the above first aspect to the above second aspect or each of implementations thereof.

For the above technical solutions, in the two-step random access procedure, the network device can send the first PDCCH and the second PDCCH to the terminal device, the terminal device can determine whether to blindly detect the second PDCCH according to the blind detection result of the first PDCCH, and if the terminal device determines to blindly detect the second PDCCH, it can determine whether the contention conflict in the random access procedure is solved according to a blind detection result of the second PDCCH, thereby can solve the contention conflict in the two-step random access procedure.

DESCRIPTION OF EMBODIMENTS

The following will describe technical solutions in the embodiments of the present application with reference to the drawings in the embodiments of the present application. Obviously, the described embodiments are part of the embodiments of the present application, but not all of them. Based on the embodiments of the present application, all other embodiments obtained by those of ordinary skills in the art without making creative efforts belong to the protection scope of the present application.

The embodiments of the present application can be applied to various communication systems, for example, global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunication system (UNITS), wireless local area networks (WLAN), wireless fidelity (WiFi), next generation communication system or other communication systems, etc.

Generally speaking, a traditional communication system supports a limited number of connections and is easy to implement. However, with the development of communication technology, a mobile communication system will not only support traditional communication, but also support, for example, device to device (D2D) communication and machine to machine (M2M) communication, machine type communication (MTC), and vehicle to vehicle (V2V) communication, etc., and the embodiments of the present application can also be applied to these communication systems.

In an embodiment, the communication system can be applied to a carrier aggregation (CA) scenario, and can also be applied to a dual connectivity (DC) scenario, and can further be applied to a standalone (SA) network deployment scenario.

Figure 1:
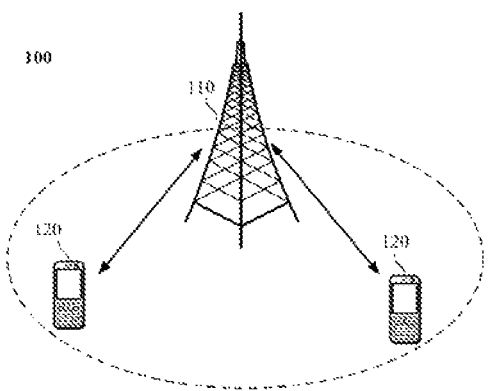
FIG. 1 is a schematic diagram of a communication system architecture according to an embodiment of the present application.

Illustratively, a communication system 100 applied in the embodiment of the present application is shown in FIG. 1. The communication system 100 may include a network device 110, where the network device 110 may be a device communicating with a terminal device 120 (also called a communication terminal or a terminal). The network device 110 may provide communication coverage for a specific geographical area, and may communicate with the terminal device in the coverage area. In an embodiment, the network device 110 may be a base station (Base Transceiver Station, BTS) in a GSM system or a CDMA system, and may also be a base station (NodeB, NB) in a WCDMA system, and may further be an evolutional base station (Evolutional NodeB, eNB or eNodeB) in an LTE system, or a wireless controller in a cloud radio access network (CRAN), or the network device can be a mobile switching center, a relay station, an access point, a vehicle-mounted device, a wearable device, a hub, a switch, a network bridge, a router, a network side device in a 5G network or a network device in a future evolved public land mobile network (PLMN), etc.

The communication system 100 also includes at least one terminal device 120 located in the coverage area of the network device 110. The "terminal device" used herein includes but is not limited to a device being connected via a wired line, such as a device being connected via a public switched telephone network (PSTN), a digital subscriber line (DSL), a digital cable and a direct cable; and/or a device being connected via another data network; and/or a device being connected via a wireless interface, such as for a cellular network, a wireless local area network (WLAN), a digital television network such as a DVB-H network, a satellite network, an AM-FM broadcast transmitter; and/or an apparatus configured to receive/transmit communication signals of another terminal device; and/or an Internet of things (IoT) device. The terminal device configured to communicate through a radio interface can be called a "radio communication terminal", a "radio terminal", or a "mobile terminal". Examples of mobile terminals include, but are not limited to, a satellite or cellular phone; personal communication system (PCS) terminal being capability of combining cellular radio telephone and data processing, faxing and data communication capability; personal digital assistant (PDA) including a radio telephone, a pager, an Internet/intranet access, a Web browser, a notebook, a calendar and/or global positioning system (GPS) receiver; and a conventional laptop and/or a palmtop receiver or other electronic apparatuses including a radio telephone transceiver. The terminal device can refer to an access terminal, a user equipment (UE), a user unit, a user station, a mobile station, a mobile platform, a remote station, a remote terminal, a mobile device, a user terminal, a terminal, a wireless communication device, a user agent or a user apparatus. The access terminal can be a cellular telephone, a cordless telephone, a session initiation protocol (SIP) telephone, a wireless local loop (WLL) station, a PDA, a handheld device with a wireless communication function, a computer device or other processing devices connected to a wireless modem, a vehicle-mounted device, a wearable device, a terminal device in a 5G network or a terminal device in a future evolved PLMN, etc.

The network device 110 may provide service for a cell, and the terminal device 120 communicates with the network device 110 through a transmission resource used by the cell (for example, a frequency domain resource, or a spectrum resource), where the cell can be a cell corresponding to the network device 110 (for example a base station), and the cell can belong to a macro base station, and can also belong to a base station corresponding to a small cell, where the small cell herein can include, for example, a metro cell, a micro cell, a pico cell, a femto cell, etc., and these cells have features of small coverage and low transmission power, which are suitable for providing data transmission service with high speed.

FIG. 1 illustratively shows one network device and two terminal devices. In an embodiment, the communication system 100 may include a plurality of network devices and other number of terminal devices may be included in coverage of each network device, which is not limited by the embodiment of the present application.

In an embodiment, the communication system 100 may further includes other network entities such as a network controller, a mobile management entity, etc., which is not limited by the present embodiment.

It should be understood that a device with a communication function in a network/system of the embodiment of the present application can be referred to as a communication device. The communication system 100 shown in FIG. 1 is taken as an example, the communication device can include the network device 110 and the terminal device 120 with communication function, and the network device 100 and the terminal device 120 can be a specific device mentioned above, which will not be described in detail herein; the communication device may further include other devices in the communication system 100, for example, other network entities such as a network controller, a mobile management entity, etc., which is not limited by the embodiment of the present application.

It should be understood that the terms "system" and "network" herein are often used interchangeably herein. The term "and/or" herein is only an association relation describing the associated objects, which represents that there can be three kinds of relations, for example, A and/or B can represent three kinds of situations that A exists alone, A and B exist at the same time, and B exists alone. In addition, the character "/" herein generally represents that the contextually associated objects is an "or" relationship.

After a searching process of the cell, the terminal device has already obtained DL (downlink) synchronization with the cell, therefore the terminal device can receive DL data. However, only when obtaining UL synchronization with the cell, the terminal device can perform UL transmission. The terminal device can establish connection and obtain UL synchronization with the cell through random access procedure. In order to facilitate understanding of the solution of the embodiment of the present application, the random access procedure will be briefly introduced with reference to FIG. 2 and FIG. 3.

The random access procedure can generally be triggered by the following events:

(1) Initial access.

The terminal device can enter a radio resource control (RRC)_CONNECTED from an RRC_IDLE.

(2) RRC Connection Re-establishment procedure.

(3) Handover.

Meanwhile, the terminal device is in CONNECTED, and needs to establish UL synchronization with a new cell.

(4) DL or UL data arrival during RRC_CONNECTED when UL synchronization status is "non-synchronized".

(5) UL data arrival during RRC_CONNECTED when there is no physical uplink control channel (PUCCH) resource for scheduling request (SR) available.

(6) SR failure.

(7) Request by RRC upon synchronous reconfiguration.

(8) Transition from RRC_INACTIVE.

(9) To establish time alignment at SCell addition.

(10) The terminal device requests for other system information (OSI).

(11) The terminal device needs to perform beam failure recovery.

Figure 2:
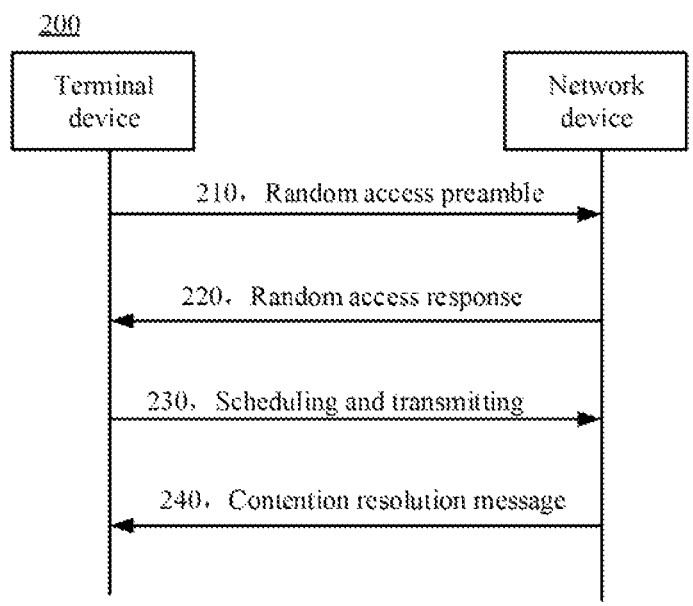
FIG. 2 is a schematic flowchart of a method for four-step random access according to an embodiment of the present application.
Figure 3:
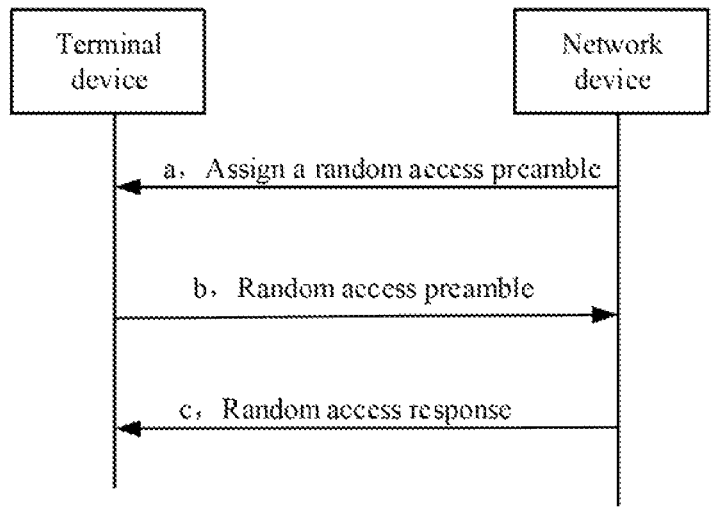
FIG. 3 is a schematic flowchart of another method for two-step random access according to an embodiment of the present application.

In an NR system, two random access methods can be supported: a random access method based on contention as shown in FIG. 2 and a random access method based on non-contention as shown in FIG. 3. The four-step random access procedure based on contention will be described briefly in the following:

step 1, a terminal device sends a random access preamble (that is, message1, Msg1) to a network device.

Where the random access preamble can also be referred to as a preamble, a random access preamble sequence, a preamble sequence, etc.

Specifically, the terminal device can select a physical random access channel (PRACH) resource, where the PRACH resource can includes a time-domain resource, a frequency domain resource and a code-domain resource. Then the terminal device can send the selected Preamble in the selected PRACH resource. The network device can estimate a transmission latency between the network device and the terminal device according to the Preamble, and calibrate an UL timing according to the latency, and approximately determine a resource size required by the terminal device to transmit a message 3 (Msg3).

Step 2, the network device sends a random access response (RAR, that is message2, Msg2) to the terminal device.

After sending the Preamble to the network device, the terminal device can open an RAR window, and detect a corresponding physical downlink control channel (PDCCH) according to a random access radio network temporary identifier (RA-RNTI) in the RAR window. If having detected the PDCCH scrambled by the RA-RNTI, the terminal device can obtain the physical downlink shared channel (PDSCH) scheduled by the PDCCH. Where, the PDSCH includes the RAR corresponding to the Preamble.

If the RAR replied by the network device is not received in the RAR window, the terminal device can consider that the random access procedure fails. It should be understood that, both the terminal device and the network device need to uniquely determine a value of the RA-RNTI, otherwise, the terminal device cannot decode the RAR.

In an embodiment, the RA-RNTI can calculate the value of the RA-RNTI through a time-frequency position of the Preamble which is clear to both a transmitter and a receiver. For example, the RA-RNTI associated with the Preamble can be calculated through formula (1):

$$RA\text{-}RNTI = 1 + s\_id + 14 \times t\_id + 14 \times 80 \times f\_id + 14 \times 80 \times 8 \times ul\_carrier\_id \quad (1)$$

where, s_id is an index of a first orthogonal frequency division multiplexing (OFDM) symbol of the PRACH resource ($0 \leq s\_id < 14$), t_id is an index of a first time slot of the PRACH resource in a system frame ($0 \leq t\_id < 80$), f_id is an index of the PRACH resource in a frequency domain ($0 \leq f\_id < 8$), ul_carrier_id is an UL carrier for transmitting Preamble (0 represents NUL carrier, and 1 represents SUL carrier). For FDD, there is only one PRACH resource per subframe, so f_id is fixed at 0.

In other words, since the time-frequency position of the Preamble sent by the terminal device is determined, when decoding the Preamble, the network device also obtains the time-frequency position of the Preamble, and then can know the RA-RNTI required to be used in the RAR. When the terminal device successfully receives an RAR (decoded by using the determined RA-RNTI), and the random access preamble identifier (RAPID) in the RAR is the same as the Preamble index sent by the terminal device, it can be considered that the RAR has been successfully received, and the terminal device can stop detecting the PDCCH scrambled by the RA-RNTI at the same time.

Figure 4:
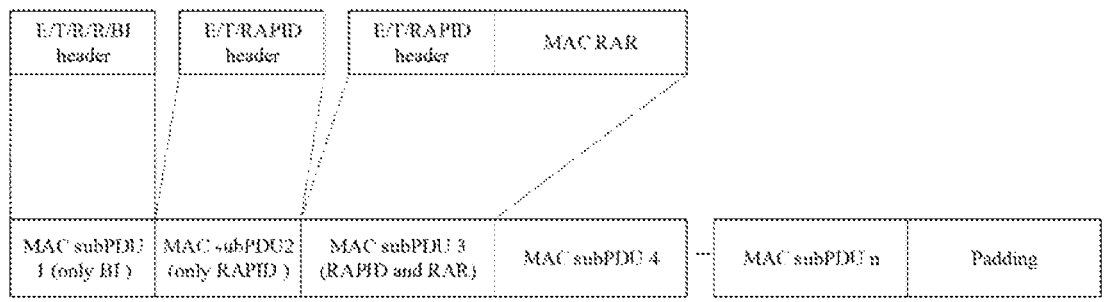
FIG. 4 is a schematic diagram of an MAC PDU including an RAR according to an embodiment of the present application.

The RAR can be carried in a media access control (MAC) protocol data unit (PDU), and information carried by the RAR will be introduced from an angle of the composition of the MAC PDU including the RAR with reference to FIG. 4.

It can be seen from FIG. 4, one MAC PDU can include one or more MAC subPDU and a padding bit that may existing, one MAC subPDU may only have a backoff indicator (BI), or only have a random access preamble identifier (RAPID), or RAPID and MAC RAR.

It can be seen from the structure of MAC PDU that if the network device has detected random access requests from multiple terminal devices on the same PRACH resource, these access requests can be responded by using only one MAC PDU, and the response of each random access request (corresponding to one Preamble index) corresponds to one RAR. In other words, if multiple terminal devices send the Preamble on the same PRACH resource (time-frequency positions are the same and the same RA-RNTI is used), the corresponding RAR is multiplexed in the same MAC PDU.

That is, all terminal devices using the same PRACH resource to send the Preamble (the Preambles are not necessarily the same) detect the same PDCCH scrambled by the RA-RNTI, and receive the same MAC PDU, but different RAPID corresponds to different RAR.

Since the MAC PDU can only be scrambled by using one RA-RNTI, it means that the RAR corresponding to the Preamble sent by using different PRACH resources (time-frequency positions are different) cannot be multiplexed into the same MAC PDU.

Figure 5:
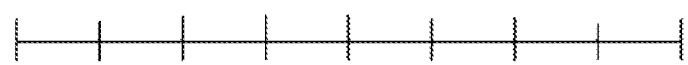
FIG. 5 is a schematic block diagram of a BI header according to an embodiment of the present application.

FIG. 5 is a schematic block diagram of a BI header according to an embodiment of the present application. As shown in FIG. 5, the BI header may include an extension field (E), a type field (T), two reserved fields (R), and a BI value.

For the BI header, the BI header only presents once, and is located at a first header of the MAC header. If the terminal device receives a BI header, a back off value will be stored, where the value equals to a value corresponding to the BI of the header; otherwise, the terminal device can set the Back-off value as 0. The value corresponding to the BI indicates a time range required to wait before the terminal device re-sends the Preamble. If the terminal device does not receive the RAR in the RAR window, or there is no RAPID in the received RAR matching with the preamble index selected by itself, it can be considered that this RAR reception is failed. At this time, the terminal device needs to wait for a period of time before initiating random access. The time to wait can be any one random value in the waiting time interval specified by the value corresponding to 0 to BI.

Figure 6:
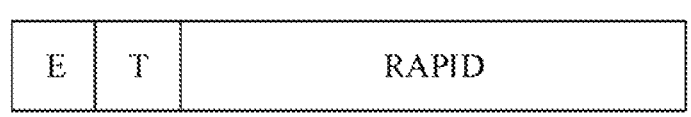
FIG. 6 is a schematic block diagram of an RAPID header according to an embodiment of the present application.

FIG. 6 is a schematic block diagram of an RAPID header according to an embodiment of the present application.

As shown in FIG. 6, the RAPID header may include an E, a T and an RAPID value. Where the RAPID is a Preamble index received by a network device response. If the terminal device finds that the value is the same as the index that the terminal device used when sending the Preamble, it can be considered that the corresponding RAR has been successfully received.

Figure 7:
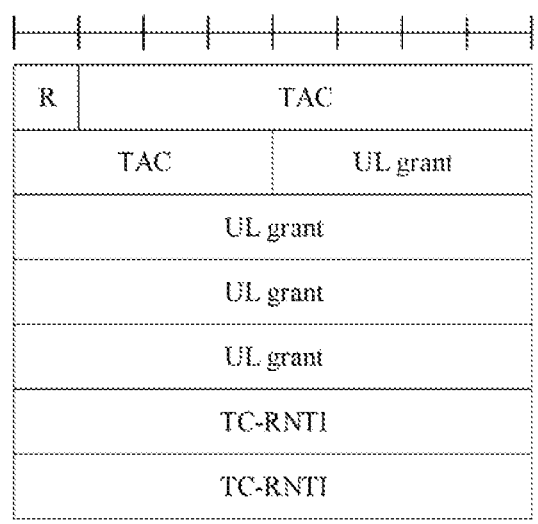
FIG. 7 is a schematic block diagram of an MAC RAR according to an embodiment of the present application.

FIG. 7 is a schematic block diagram of an MAC RAR according to an embodiment of the present application. As shown in FIG. 7, the MAC RAR may include: a reserved bit R (for example, 1 bit), a timing advance command (TAC), a UL grant, and a temporary cell radio network temporary identifier (TC-RNTI).

Where, the TAC can be used to designate an amount of time adjustment required for UL synchronization of the terminal device, which may occupy 12 bits. The UL grant can be used to schedule the UL resource indication of the Msg3. The TC-RNTI can be used to scramble the PDCCH of the Msg4 (initial access).

Step 3, the terminal device sends the Msg3.

After receiving the RAR message, the terminal device judges whether the RAR is RAR message belonging to the terminal device, for example, the terminal device can use the preamble index to verify, after determining the RAR message is that belonging to the terminal device, the terminal device can generate the Msg3 in the RRC layer, and send the Msg3 to the network device, where the identification information of the terminal device and so on needs to be carried.

Where, the Msg3 is mainly used to inform the network device of the triggering event of the random access. For different random access triggering events, the Msg3 sent by the terminal device in step 3 may include different contents.

For example, for a scenario of initial access, the Msg3 may include RRC setup request message generated in th RRC layer. In addition, the Msg3 may further carry, for example, a 5G serving-temporary mobile subscriber identity (S-TMSI) or random number and so on of the terminal device.

For another example, for a scenario of RRC Connection Re-establishment, the Msg3 may include RRC Connection Re-establishment request message generated in the RRC layer. In addition, the Msg3 may further carry, for example, cell radio network temporary identifier (C-RNTI), etc.

For another example, for a scenario of Handover, the Msg3 may include RRC handover confirm message generated in the RRC layer, which carries the C-RNTI of the terminal device. In addition, the Msg3 may further carry information for example buffer status report (BSR), etc. For other triggering events for example scenarios of UL/DL data arrivals, the Msg3 may at least include the C-RNTI of the terminal device.

Step 4, the network device sends contention resolution message to the terminal device, that is, the Msg4.

The network device sends the Msg4 to the terminal device, and the terminal device receives the Msg4 correctly to complete the contention resolution. For example, during a process of RRC connection establishment, the RRC connection establishment message can be carried in the Msg4.

Since the terminal device in step 3 can carry a unique identifier of the terminal device in Msg3, in the mechanism of contention resolution, the network device will carry the unique identifier of the terminal device in Msg4 to designate the terminal device that wins the contention. And other terminal devices that have not won the contention resolution will re-initiate the random access.

It should be understood that in the embodiment of the present application, there are two methods to resolve the contention conflict:

method 1, if the terminal device carries the C-RNTI in the Msg3, the Msg4 can be scheduled by the PDCCH scrambled by using the C-RNTI.

method 2, if the terminal device does not carry the C-RNTI in the Msg3, for example initial access, the Msg4 can be scheduled by the PDCCH scrambled by using the TC-RNTI. At this time, the contention conflict can be resolved by receiving the PDSCH of Msg4 through the terminal device, obtaining the conflict resolution ID, and judging whether the conflict is resolved by matching the conflict resolution ID with the common control channel (CCCH) service data unit (SDU) in msg3.

Figure 8:
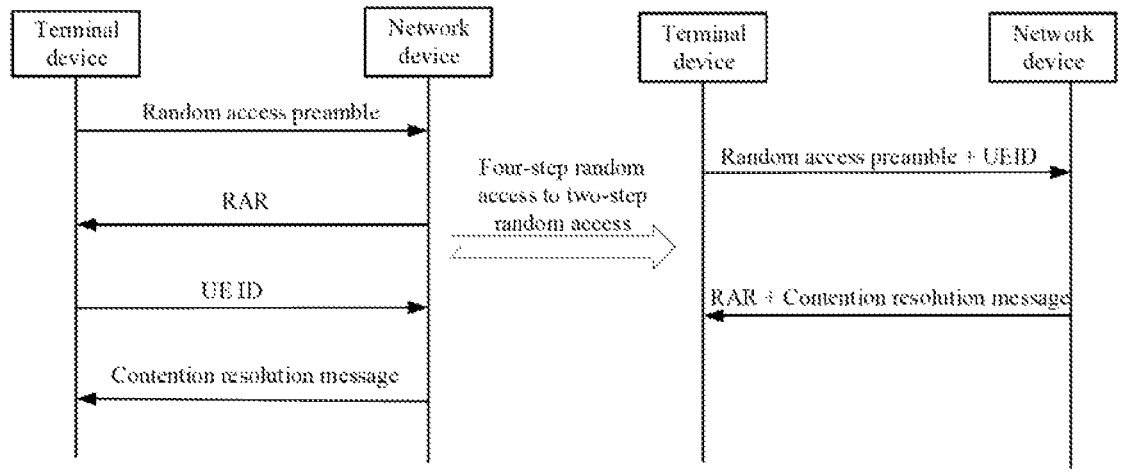
FIG. 8 is a schematic flowchart of a four-step random access to a two-step random access according to an embodiment of the present application.

The latency of the four-step random access is relatively large, which is not suitable for ultra-reliable and low-latency scenarios in 5G. Considering the characteristics of related services with ultra-reliable and low-latency, a solution for two-step random access procedure is proposed. As shown in FIG. 8, in the two-step random access procedure, simply speaking, it is equivalent to combining the first and third steps of the four-step random access procedure into the first step of the two-step random access procedure, and combining the second and fourth steps of the four-step random access procedure into the second step of the two-step random access procedure.

More specifically, the two-step random access procedure may include:

step 1: A terminal device sends a first message to a network device.

The first message can be constituted by a Preamble and a payload, where the Preamble is a Preamble of the four-step random access, the Preamble is transmitted on the PRACH resource, the Payload mainly carries information in the Msg3 in the four-step random access. For example, it can contain a CCCH SDU, such as the random access corresponding to the RRC_IDLE, and can also contain a C-RNTI MAC control element (CE), such as the random access mainly corresponding to RRC_CONNECTED. The Payload may be carried on a UL channel, where the channel may be, for example, a physical uplink shared channel (PUSCH).

It should be understood that the first message may carry the Preamble and part or all of the information carried in Msg3 in the four-step random access procedure.

Step 2: the network device sends a second message to the terminal device.

If the network device successfully receives the first message sent by the terminal device, the second message can be sent to the terminal device. The second message may contain part or all of the information carried in the Msg2 and the Msg4 in the four-step random access procedure. The names of the first message and the second message are not limited, that is, the first message and the second message can also be represented as other names. For example, the first message can also be called as Msg A, random access request message or new Msg 1, and the second message can also be called as Mas B or new Msg2.

It should also be understood that, FIG. 8 is only a specific implementation method of the two-step random access procedure, and will not constitute limitation to the protection scope of the present application.

However, in the two-step random access procedure, since the first message can be shared by a plurality of terminal devices, the problem of contention conflict needs to be considered, and how to resolve the contention conflict. To resolve the above problem, the embodiment of the present application provides a random access method, the method causing the terminal device to effectively resolve the contention conflict in the two-step random access procedure.

Figure 9:
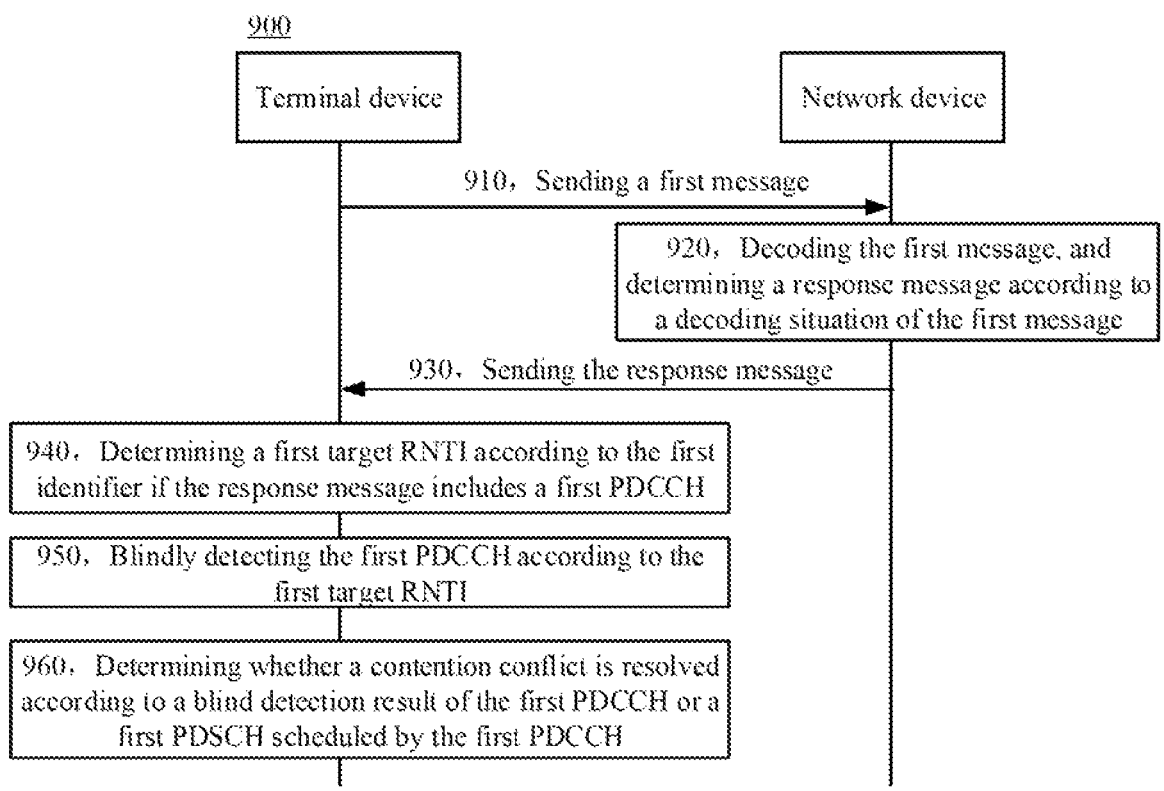
FIG. 9 is a schematic flowchart of a random access method according to an embodiment of the present application.

FIG. 9 is a schematic flowchart of a random access method 900 according to an embodiment of the present application. The method described in FIG. 9 can be executed by the terminal device and the network device, where the terminal device, for example, can be the terminal device 120 shown in FIG. 1, and the network device, for example, can be the network device 110 shown in FIG. 1. As shown in FIG. 9, the method 900 may at least include part of the contents of the following contents.

In 910, a terminal device sends a first message to a network device, where the first message includes a random access preamble (i.e. Preamble) and a UL message, and the UL message includes a first identifier.

In 920, after receiving the first message, the network device decodes the first message, and determines a response message to be sent to the terminal device according to a decoding situation of the first message.

In 930, the network device sends the response message to the terminal device.

In 940, if the response message sent by the network device includes a first PDCCH, the terminal device determines a first target RNTI used for blindly detecting the first PDCCH according to the first identifier.

In 950, the terminal device blindly detects the first PDCCH according to the first target RNTI.

In 960, the terminal device determines whether the contention conflict in the random access procedure is resolved according to the result of the blind detection of the first PDCCH or the first PDSCH.

It should be understood that, the first message in method 900 may correspond to the first message in FIG. 8.

In the embodiment of the present application, the first message including the Preamble and the UL message can be understood as: between the Preamble and the UL message sent by the terminal device to the network device, there are no other messages between the network device and the terminal device, and/or, the network device can simultaneously send a second message to the terminal device aiming at the Preamble and the UL message.

Specifically, the terminal device may first select resource of the first message, including PRACH resource and corresponding PUSCH resource, and then transmit the first message using the selected resource. Where, the terminal device can transmit the Preamble by using the PRACH resource, and transmit the payload by using the PUSCH resource.

The terminal device can be in CONNECTED, INACTIVE or IDLE. When the terminal device is in different RRC state, the first identifiers included in the first message can be different. The first identifiers can be basically represented as two types, one type is that the C-RNTI MAC CE is contained in the Payload, the other type is that the C-RNTI MAC CE is not contained in the Payload, that is, the CCCH SDU is contained.

The terminal device can determine the first identifier carried in the Payload according to the current RRC state where the terminal device is currently located. When the terminal device is in CONNECTED, the first identifier can be, but is not limited to, the C-RNTI, where the C-RNTI may be contained in the C-RNTI MAC CE. Or, when the terminal device is in IDLE or INACTIVE, the first identifier may include, but is not limited to, random number, 5G-S-TMSI (or a part of 5G-S-TMSI), identify-RNTI (I-RNTI), and short I-RNTI. Where bit number of the random number is fixed, the I-RNTI can be used to identify the content of the terminal device in RRC_INACTIVE. At this time, the identifier of the terminal device can be contained in the CCCH SDU.

The SDU may include the RRC message transmitted in the signaling radio bearer (SRB)0, for example:
rrcSetupRequest RRCSetupRequest,
rrcResumeRequest RRCResumeRequest,
rrcReestablishmentRequest RRCReestablishmentRequest,
rrcSystemInfoRequest RRCSystemInfoRequest The message in the above content generally may include the first identifier. For example, if the terminal device transmits RRCSetupRequest to the network device, the first identifier can be a random number or a part of a 5G-S-TMSI.

The terminal device sends the first message to the network device, correspondingly, the network device may receive the first message sent by the terminal device, and decode the first message. For the network device decoding the first message, there may be a plurality of situations:

situation 1: the network device successfully decodes one or more Preambles, but does not decode the Payload in the PUSCH.

situation 2: the network device successfully decodes one or more Preambles, and one or more Payloads.

situation 3: the network device successfully decodes the Payload but does not decode the Preamble. It should be noted that, since the network device needs to take the Preamble as the UL timing estimation, the possibility of the occurrence of situation 3 is small, and the embodiment of the present application does not consider the situation 3.

The situations 1 and 2 will be described in detail in the following.

Since a plurality of terminal devices may adopt the same PRACH resource to transmit the Preamble. Therefore, in situation 1, if the network device only decodes the Preamble, at this time, the network device may be not able to distinguish the terminal device. Under this situation, the network device can respond to the Preamble, that is, the RAR in the four-step random access is sent to the terminal device to respond to the Preamble. In this way, for the terminal device of two-step random access, the four-step random access can be returned to; for the terminal device of four-step random access, the procedure is normal. Or the Preamble is not responded, that is, the network device can send second instruction information to the terminal device, where the second instruction information can be used to instruct the terminal device to retransmit the first message.

It should be understood that the first message retransmitted by the terminal device can be the same as or different from the previously transmitted first message, and the resource for retransmitting the first message can be the same as or different from that for the previously transmitted first message.

Further, if the network device can distinguish the terminal device performing the four-step random access from the terminal device performing the two-step random access, the network device can send third instruction information to the terminal device, where the third instruction information can be used to instruct the terminal device to stop blindly detecting the first PDCCH, so the terminal device can retransmit the first message as soon as possible. Where the first PDCCH is used for scheduling RAR.

In an embodiment, the PRACH resource of the terminal device performing two-step random access and the PRACH resource of the terminal device performing four-step random access can be different, at this time, the network device can distinguish the terminal device performing four-step random access from the terminal device performing two-step random access according to the PRACH resource receiving the Preamble.

Where, the PRACH resource can be configured by the network device, or can be preset in the terminal device.

In situation 2, the network device can distinguish the terminal device corresponding to the identifier in the payload. At this time, the network device can have different responding methods according to the first identifier.

In an embodiment, there is a certain association relationship between the PRACH resource carrying the Preamble and the PUSCH carrying the Payload, when the network device responds to the Payload, the above association relationship can be based on to respond to the Payload. For example, if the Preamble decoding succeeds, but the Payload decoding corresponding to the Preamble decoding does not succeed, the network device can respond to the Preamble, or not to respond to the Preamble. If the Preamble decoding succeeds, and the Payload decoding corresponding to the Preamble also succeeds, the network device can respond to the Payload. Further, since the successfully decoded Preamble may be used simultaneously by a plurality of terminal devices, therefore the network device can further respond to the successfully decoded Preamble.

In the embodiment of the present application, if the network device responds to the RAR, the network device can send the first PDCCH to the terminal device.

In a possible embodiment, the terminal device can determine a first target RNTI according to the first identifier, and blindly detect the first PDCCH according to the first target RNTI.

If the first identifier is C-RNTI, the terminal device determines that the first target RNTI can be C-RNTI; if the first identifier is other identifier other than C-RNTI, the terminal device can determine that the first target RNTI can be RA-RNTI. Illustratively, the other identifier other than C-RNTI can be random number, 5G-S-TMSI, I-RNTI, Short I-RNTI, etc.

In an embodiment, RA-RNTI can have a corresponding relationship with the PRACH resource for transmitting the Preamble in the first message, and/or, the PUSCH resource for transmitting the Payload. That is, the terminal device or the network device can determine the RA-RNTI according to the PRACH resource for transmitting the Preamble in the first message, and/or, the PUSCH resource for transmitting the Payload.

Illustratively, the corresponding relationship between the RA-RNTI and the PRACH resource for transmitting the Preamble in the first message can be: RA-RNTI can be calculated according to the time-frequency resource position of the PRACH for transmitting the Preamble, a possible calculation method is shown as formula (2):

$$\text{RA-RNTI}=1+s\_id+14\times t\_id+14\times 80\times f\_id+14\times 80\times 8\times ul\_carrier\_id \quad (2)$$

where, s_id is the index of the first OFDM symbol of the PRACH resource for transmitting the Preamble in the first message ($0 \leq s\_id < 14$), t_id is the index of the first time slot of the PRACH resource for transmitting the Preamble in the first message in a system frame (0≤t_id<80), f_id is the index of the PRACH resource for transmitting the Preamble in the first message in frequency domain (0≤f_id<8), and ul_carrier_id is the UL carrier for transmitting the Preamble in the first message (0 represents NUL carrier and 1 represents SUL carrier).

After determining the first target RNTI, the terminal device can blindly detect the first PDCCH according to the first target RNTI.

In an implementation, the terminal device blindly detecting the first PDCCH may include: after sending the first message to the network device, the terminal device starts a first timer or opens a first window, and blindly detects the first PDCCH within the duration range of the first timer or the first window.

In an embodiment, the duration of the first timer or the first window can be preset on the terminal device based on the protocol, or, can be configured to the terminal device by the network device in advance, for example, can be configured through the RRC signaling.

It should be understood that, the first timer or the first window can start after the random access preamble is sent, or can also start after the UL message is sent, which is not specifically limited by the embodiment of the present application.

The following will describe subsequent behaviors of the terminal device from two situations respectively, in which the first target RNTI is C-RNTI or RA-RNTI.

Situation 1: the first target RNTI is C-RNTI.

Under this situation, the terminal device can determine whether the contention conflict in the random access procedure is resolved according to the blind detection result of the first PDCCH.

Specifically, if the terminal device blindly detects the first PDCCH scrambled by C-RNTI, and the C-RNTI successfully matches with the first identifier in the first message, the terminal device can determine that the contention conflict in the random access procedure is resolved. If the terminal device blindly detects the first PDCCH scrambled by C-RNTI, but the C-RNTI does not successfully match with the first identifier in the first message, the terminal device can determine that the contention conflict in the random access procedure is not resolved.

Or, if the terminal device does not blindly detect the first PDCCH scrambled by C-RNTI, the terminal device can determine that the contention conflict in the random access procedure is not resolved, and the terminal device can resend the first message to the network device.

Situation 2: the first target RNTI is RA-RNTI.

Under this situation, the terminal device determine whether the contention conflict in the random access procedure is resolved according to the blind detection result of the first PDCCH or the first PDSCH scheduled by the first PDCCH, and there are two implementations, which will be described in the following respectively.

Embodiment 1

Figure 10:
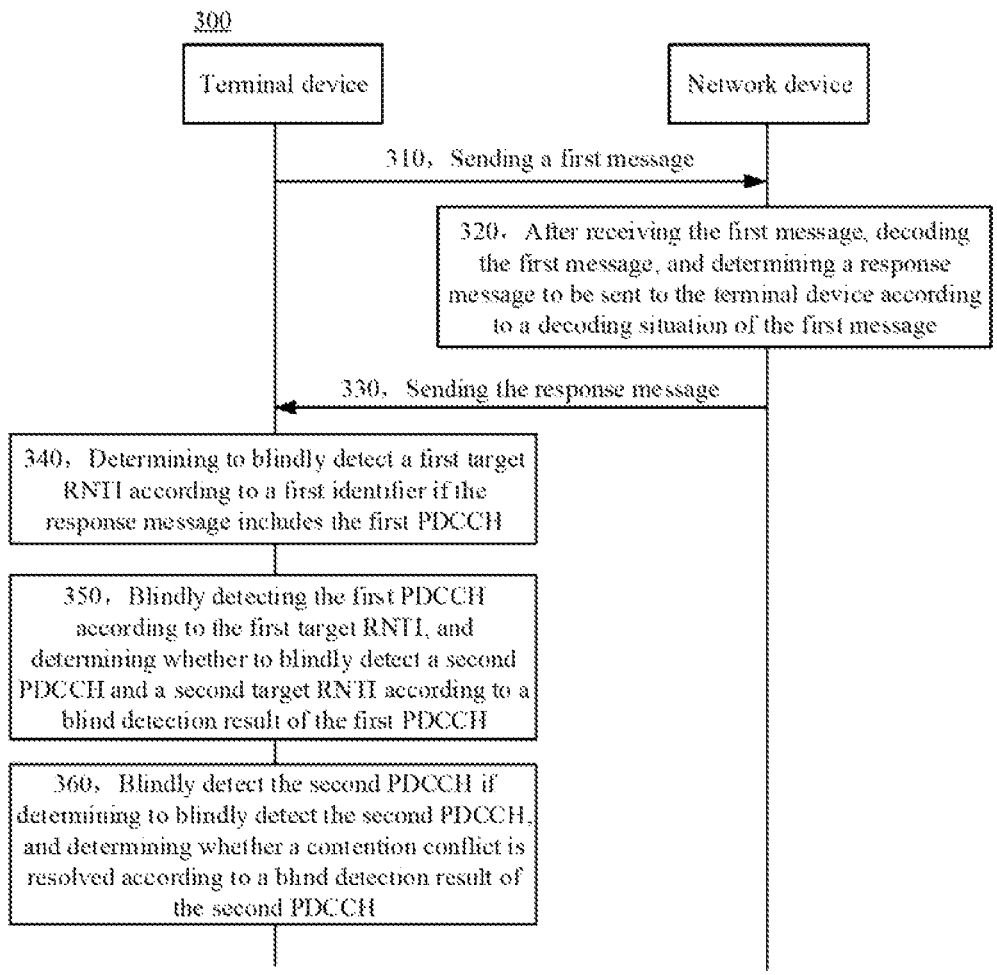
FIG. 10 is a schematic diagram of a random access method according to an embodiment of the present application.

As shown in FIG. 10, the terminal device determines whether the contention conflict in the random access procedure is resolved according to the blind detection result of the first PDCCH or the first PDSCH, including: the terminal device determine whether to blindly detect the second PDCCH according to the blind detection result of the first PDCCH; if determining to blindly detect the second PDCCH, the terminal device blindly detects the second PDCCH; then the terminal device can determine whether the contention conflict in the random access procedure is resolved according to the blind detection result of the second PDCCH.

If the terminal device does not blindly detect the first PDCCH, the terminal device can resend the first message to the network device.

If the terminal device blindly detects the first PDCCH and successfully decodes the first instruction information, and the first instruction information contains a MAC subPDU, and the RAPID contained in the header of the MAC subPDU corresponds to the Preamble index in the first message, then the terminal device can determine that the first instruction information is successfully decoded, and the terminal device can determine whether to blindly detect the second PDCCH and determine a second target RNTI used for blindly detecting the second PDCCH according to the first instruction information. Where, the information scheduled by the first PDCCH may include the first instruction information, or the first physical downlink shared channel (PDSCH) scheduled by the first PDCCH may include the first instruction information.

In an embodiment of the present application, the first PDCCH or the second PDCCH may also be an enhanced physical downlink control channel (EPDCCH), a machine type communication physical downlink control channel (MPDCCH) and a narrowband physical downlink control channel (NPDCCH), which is not limited in the present application.

As an example, if a value of at least one bit in the first instruction information is a first value, the first instruction information can be used to instruct the terminal device to blindly detect the second PDCCH.

Or, if a value of at least one bit in the first instruction information is a second value, the first instruction information can be used to instruct the terminal device not to blindly detect the second PDCCH.

Preferably, the first instruction information is one bit, at this time, the first value can be "0" or "1", and the second value can also be "0" or "1". When the first value is "0", the second value is "1"; when the first value is "1", the second value is "0".

As another example, if the first instruction information has multiple bits, when the multiple bits are the same, the first instruction information can be used to instruct the terminal device to detect the second PDCCH; if there are at least two bits in the multiple bits are different, the first instruction information can be used to instruct the terminal device not to detect the second PDCCH. For example, 3 bits in the first instruction information are used to instruct the terminal device whether to detect the second PDCCH, "000" represents that the terminal device detects the second PDCCH, "010" represents that the terminal device does not detect the second PDCCH.

It should be understood that, specific examples in the embodiment of the present application are only for better understanding of the embodiments of the present disclosure by those of skills in the art, but not to limit the scope of the embodiments of the present application. For example, when the multiple bits are the same, the first instruction information can be used to instruct the terminal device not to detect the second PDCCH.

As another example, the first instruction information can instruct the terminal device whether to detect the second PDCCH through the first parameter. Illustratively, if the first instruction information includes the first parameter, the terminal device is instructed to detect the second PDCCH; if the first instruction information does not include the first parameter, the terminal device is instructed not to detect the second PDCCH.

It should be noted that, the embodiment of the present application does not specifically limit the first parameter, any parameters capable of instructing the terminal device whether to detect the second PDCCH is all contained in the protection scope of the present application.

In an embodiment, the first instruction information can be RAR. Where, an RAR format can be the same as or different from the RAR format shown in FIG. 7, which is not limited by the embodiment of the present application.

In an embodiment, a bit position of the at least one bit can be equal to a bit position of a preserved bit in a four-step random access. Illustratively, as shown in FIG. 7, at this time, a number of the at least one bit is 1. For example, the RAR can instruct the terminal device to detect the second PDCCH through the bit "1", and instruct the terminal device not to detect the second PDCCH through bit "0".

It should be noted that, a name of the at least one bit is not limited by the embodiment of the present application.

In an embodiment, the first instruction information can also be downlink control information (DCI) carried by the first PDCCH, or other information carried by the first PDCCH.

For the terminal device, if the first instruction information is used to instruct the terminal device not to detect the second PDCCH, under one situation, the terminal device can return to the four-step random access, and the behavior is the same as the four-step random access, that is: a, processing TAC; b, processing UL grant; c, setting TC-RNTI value; d, if there is not MAC PDU in Msg3 cache, the terminal device can generate the Msg3 MAC PDU; e, the terminal device stops blindly detecting the window or the timer of the second message. Then, the terminal device can send the Msg3 to the network device, and after receiving the Msg3, the network device sends the Msg4 to the terminal device. Under another situation, the terminal device can retransmit the first message to the network device.

If the first instruction information is used to instruct the terminal device to blindly detect the second PDCCH, the terminal device blindly detects the second PDCCH.

In an embodiment, the terminal device can blindly detect the second PDCCH according to the second target RNTI.

In an implementation, the second target RNTI can be TC-RNTI or C-RNTI.

At this time, the terminal device can set TC-RNTI or C-RNTI value, where the TC-RNTI or C-RNTI value is used for the terminal device to blindly detect the possible second PDCCH scheduling in the second message.

As an example, if the terminal device blindly detects the second PDCCH using TC-RNTI, and the first identifier successfully matches with the second identifier, the terminal device can determine that the contention conflict in the random access is resolved. Where, the second identifier may be the identifier carried by the second PDCCH or the identifier in the PDSCH scheduled by the second PDCCH.

Specifically, if the terminal device blindly detects the first PDCCH scrambled by the TC-RNTI, and the terminal device successfully decodes the MAC PDU contained in the scheduling data, and the conflict resolution ID MAC CE contained in the MAC PDU matches with the CCCH SDU contained in the Payload in the first message, the terminal device can determine that the contention conflict in the two-step random access is resolved. Where the second identifier is contention conflict resolution ID MAC CE.

In another implementation, the second PDCCH can be scrambled by the third identifier. Illustratively, the third identifier can be a random value, 5G-S-TMSI, I-RNTI, Short I-RNTI, etc.

Under this implementation, if the terminal device blindly detects the first PDCCH scrambled by the third identifier, the terminal device can match the third identifier with the first identifier, if the matching is successful, the terminal device can determine that the contention conflict in the two-step random access is resolved. For example, if the second PDCCH is scrambled by a fixed-size random number, the terminal device can match the fixed-size random number with the first identifier, and if the matching is successful, the terminal device can determine that the contention conflict in the two-step random access is resolved.

The successful matching between the first identifier and the second identifier (or the third identifier) mentioned above can be understood as: the first identifier is the same as the second identifier (or the third identifier); or, the first identifier is different from the second identifier (or the third identifier), but the first identifier and the second identifier (or the third identifier) belong to the same terminal device; or, the first identifier has a corresponding relationship with the second identifier (or the third identifier).

Further, if the terminal device blindly detects the second PDCCH, the terminal device can also process the RAR scheduled by the first PDCCH, for example, process TAC, UL grant, etc.

Figure 11:
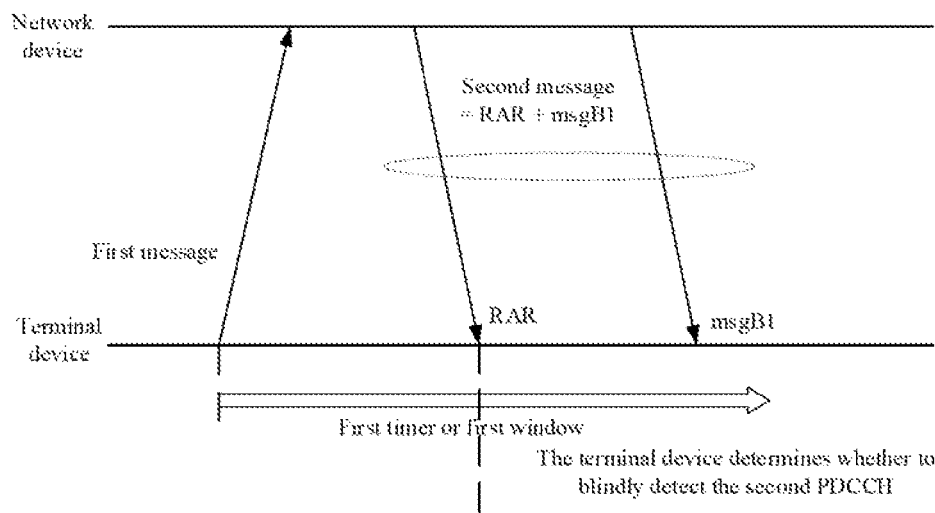
FIG. 11 is a schematic diagram of a random access method according to an embodiment of the present application.

FIG. 11 is a schematic diagram of a specific implementation of the embodiment of the present application. In FIG. 11, one arrow identifies one data transmission, and there are three data transmissions in total. The first identifier is other identifier other than C-RNTI, and the second target RNTI is TC-RNTI or C-RNTI.

It can be seen that, the terminal device sends the first message to the network device, then the terminal device starts the first timer or opens a first window, and blindly detects the second message within the duration range of the first timer or the first window. The network device sends the second message to the terminal device after receiving the first message, where the second message includes RAR and Msg B1, and the network device adopts the first PDCCH scrambled by RA-RNTI to schedule RAR. After successfully decoding the first PDCCH, the terminal device can determine whether to blindly detect the second PDCCH according to the instruction of RAR. If RAR instructs to blindly detect the second PDCCH, the terminal device blindly detects the second PDCCH; if RAR instructs not to blindly detect the second PDCCH, the terminal device does not detect the second PDCCH. Where, the network device adopts the second PDCCH scrambled by TC-RNTI or C-RNTI to schedule Msg B1.

After the terminal device resolves the contention conflict, the fourth instruction information in the second PDCCH can be used for data transmission.

In an embodiment, the fourth instruction information may be used to instruct the terminal device whether to adopt the parameters in the RAR for data transmission. For example, whether to adopt the UL grant in the RAR to perform the data transmission. If the fourth instruction information instructs the parameters in the RAR of the terminal device to perform data transmission, the terminal device can use the parameters in the RAR for data transmission.

In an embodiment, the fourth instruction information may include parameters required by the terminal device for UL transmission, for example, TAC, etc. In this way, the terminal device needs not to process the RAR.

Embodiment 2

In the present embodiment, the terminal device determines whether the contention conflict in the random access procedure is resolved, which can be: if the first identifier successfully matches with the fourth identifier, the terminal device determines that the contention conflict in the random access procedure is resolved. Where, the fourth identifier is the first PDCCH or the conflict resolution identifier carried in the first PDSCH.

Specifically, if the terminal device blindly detects the first PDCCH by using RA-RNTI and successfully decodes the first PDSCH, where the first PDSCH includes MAC PDU, and the MAC PDU includes conflict resolution ID MAC CE, and if the conflict resolution ID MAC CE successfully matches with CCCH SDU contained in Payload in the first message, the terminal device can determine that the contention conflict in the two-step random access is resolved.

The successful matching between the first identifier and the fourth identifier mentioned above can be understood as: the first identifier is the same as the fourth identifier; or, the first identifier is different from the fourth identifier, but the first identifier and the fourth identifier belong to the same terminal device; or, the first identifier has a corresponding relationship with the fourth identifier.

In an embodiment, the MAC PDU included in the first PDSCH includes at least DL resource assignment instruction information, where the DL resource assignment instruction information can be used to instruct the terminal device to receive the time-frequency resource of the second PDSCH.

Figure 12:
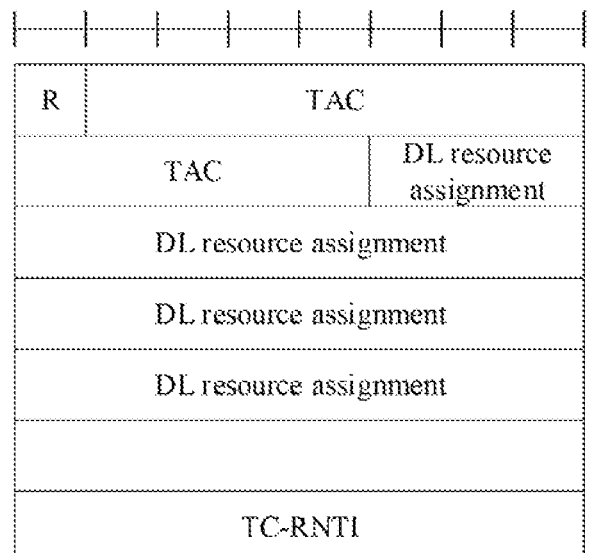
FIG. 12 is a schematic block diagram of an MAC RAR according to an embodiment of the present application.

FIG. 12 is a schematic diagram of the format of RAR carried by MAC PDU. It can be seen that the RAR includes: reserved bit R (1 bit), TAC (12 bits), DL resource assignment instruction information (DL assignment) (27 bits), and TC-RNTI (16 bits). It should be understood that, FIG. 12 is only for better understanding of the embodiment of the present disclosure by those of skills in the art, but not to limit the scope of the embodiment of the present application. For example, the bit number of respective fields of RAR in FIG. 12 is not limited to the bit number shown in FIG. 12. As an example, the DL resource assignment instruction information shown in FIG. 12 occupies 27 bits, actually, the DL resource assignment instruction information can also occupy other number of bits.

It should be understood that a MAC PDU may include both the RAR shown in FIG. 7 and the RAR shown in FIG. 12, after receiving the RAR, the terminal device may not be sure which format the received RAR is. Therefore, fifth instruction information can be included in the MAC PDU, where the fifth instruction information can be used to instruct whether the MAC PDU included in the first PDSCH includes the DL resource assignment instruction information. If the DL resource assignment instruction information is included, the terminal device can determine that the RAR carried in the MAC PDU is the RAR shown in FIG. 12; if the DL resource assignment instruction information is not included, the terminal device can determine that the RAR carried in the MAC PDU is the RAR shown in FIG. 7.

In an embodiment, the fifth instruction information can occupy at least one bit of the MAC PDU.

When the fifth instruction information occupies one bit of the MAC PDU, illustratively, if the bit is "0", it can represent that the MAC PDU includes the DL resource assignment instruction information; if the bit is "1", it can represent that the MAC PDU does not include the DL resource assignment instruction information. Or, if the bit is "0", it can represent that the MAC PDU does not include the DL resource assignment instruction information; if the bit is "1", it can represent that the MAC PDU includes the DL resource assignment instruction information.

In an embodiment, a bit position of a bit can be equal to a position of a preserved bit in a RAR in a four-step random access.

When the fifth instruction information occupies multiple bits of the MAC PDU, illustratively, when the multiple bits are the same, the fifth instruction information can be used to instruct that the terminal device includes the DL resource assignment instruction information; if there are at least two bits in the multiple bits are different, the fifth instruction information can be used to instruct that the DL resource assignment instruction information is not included. For example, 3 bits in the fifth instruction information are used to instruct whether the MAC PDU includes the DL resource assignment instruction information, "111" represents that the MAC PDU includes the DL resource assignment instruction information, and "110" represents that the MAC PDU does not include the DL resource assignment instruction information.

Illustratively, when the number of "0" bits in the multiple bits is greater than or equal to a threshold, the fifth instruction information can be used to instruct that the DL resource assignment instruction information is not included; when the number of "0" bits in the multiple bits is smaller than the threshold, the fifth instruction information can be used to instruct that the DL resource assignment instruction information is included. For example, the threshold is 2, the 3 bits in the fifth instruction information are used to instruct whether the MAC PDU includes the DL resource assignment instruction information, and if the 3 bits are "011", it is represented that the MAC PDU includes the DL resource assignment instruction information.

It should be understood that the relevant descriptions in Embodiment 1 can be applied to Embodiment 2, and will not be repeated herein for the sake of brevity of the contents.

For the above technical solution, in the procedure that the terminal device determines whether the contention conflict in the random access procedure is resolved, the PDCCH needs not to be blindly detected twice, thereby reducing energy consumption of the terminal device, and improving the efficiency of random access procedure.

It should be understood that in the embodiments of the present application, "first", "second", "third" and "fourth" are only for distinguishing different objects, but do not limit the scope of the embodiments of the present application.

In the embodiments of the present application, in the two-step random access procedure, the network device can send the first PDCCH and the second PDCCH to the terminal device, the terminal device can determine whether to blindly detect the second PDCCH according to the blind detection result of the first PDCCH, and if the terminal device determines to blindly detect the second PDCCH, it can determine whether the contention conflict in the random access procedure is solved according to a blind detection result of the second PDCCH, thereby can solve the contention conflict in the two-step random access procedure.

The above describes the preferable implementations of the present application with reference to the accompanying drawings in detail, however, the present application is not limited to specific details in the above implementations, within the technical conception of the present application, multiple simple variations can be performed to technical solutions of the present application, and these simple variations all belong to the protection scope of the present application.

For example, the respective specific technical features described in the above specific implementations can be combined in any suitable way without contradiction, in order to avoid unnecessary repetition, various possible combinations are not explained separately in the present application.

For another example, various different implementations of the present application can be combined arbitrarily, as long as they do not violate the idea of the present application, and they should also be regarded as the contents disclosed by the present application.

It should be understood that in various method embodiments of the present application, the size of the sequence numbers of the above-mentioned various processes does not mean the order of execution, and the execution order of various processes should be determined by its functions and internal logic, and should not constitute any limitation on the implementation process of the embodiments of the present application.

A communication method according to the embodiments of the present application has been described in detail above, and a communication apparatus according to the embodiments of the present application will be described below with reference to FIG. 11 to 13, the technical features described by the method embodiments are applicable to the following apparatus embodiments.

FIG. 11 shows a schematic block diagram of a terminal device 400 of an embodiment of the present application. As shown in FIG. 11, the terminal device 400 includes:

a communicating unit 410, configured to send a first message to a network device, where the first message includes a random access preamble and UL message, and the UL information contains a first identifier;

a processing unit 420, configured to determine a first target radio network temporary identifier RNTI used for blindly detecting a first physical downlink control channel PDCCH according to the first identifier.

The processing unit 420 is further configured to blindly detect the first PDCCH according to the first target RNTI.

The processing unit 420 is further configured to determine whether a contention conflict in a random access procedure is resolved according to a blind detection result of the first PDCCH or a first physical downlink shared channel PDSCH scheduled by the first PDCCH.

In an embodiment, the processing unit 420 is further configured to: start a first timer or open a first window after the communicating unit 410 sends the first message to the network device; the processing unit 420 is specifically configured to: blindly detect the first PDCCH within a duration range of the first timer or the first window according to the first target RNTI.

In an embodiment, the first identifier is cell-radio network temporary identifier C-RNTI, and the first target RNTI is C-RNTI.

In an embodiment, the processing unit 420 is specifically configured to: determine that the contention conflict in the random access procedure is resolved if the processing unit 420 blindly detects the first PDCCH; determine that the contention conflict in the random access procedure is not resolved if the processing unit 420 does not blindly detect the first PDCCH.

In an embodiment, the first identifier is other identifier other than the C-RNTI, and the first target RNTI is RA-RNTI.

In an embodiment, the RA-RNTI is determined according to a position of physical random access channel PRACH resource for transmitting the random access preamble, and/ or, a position of the physical uplink shared channel PUSCH resource for transmitting the UL message.

In an embodiment, the processing unit 420 is specifically configured to: determine whether to blindly detect a second PDCCH according to a blind detection result of the first PDCCH; blindly detect the second PDCCH if determining to blindly detect the second PDCCH; determine whether the contention conflict in the random access procedure is resolved according to a blind detection result of the second PDCCH.

In an embodiment, the processing unit 420 is specifically configured to: determine whether to blindly detect the second PDCCH and determine the second target RNTI according to the first instruction information if the processing unit 420 blindly detects the first PDCCH, where the first PDCCH includes the first instruction information, or the PDSCH scheduled by the first PDCCH includes the first instruction information.

In an embodiment, if a value of at least one bit in the first instruction information is a first value, the first instruction information is used to instruct the terminal device to blindly detect the second PDCCH.

In an embodiment, if a value of at least one bit in the first instruction information is a second value, the first instruction information is used to instruct the terminal device not to blindly detect the second PDCCH.

In an embodiment, the processing unit 420 is specifically used to: determine to blindly detect the second PDCCH if the first instruction information is used to instruct the terminal device 400 to blindly detect the second PDCCH; determine not to blindly detect the second PDCCH if the first instruction information is used to instruct the terminal device 400 not to blindly detect the second PDCCH.

In an embodiment, the first instruction information is contained in the random access response RAR.

In an embodiment, a bit position of at least one bit in a RAR is equal to a bit position of a preserved bit in a four-step random access.

In an embodiment, if the terminal device does not blindly detect the second PDCCH, the communicating unit 410 is further configured to: send a message 3 in the four-step random access to the network device; receive a message 4 sent by the network device aiming at the message 3;

the processing unit 420 is further configured to: determine whether the contention conflict in the random access procedure is resolved according to the message 4.

In an embodiment, if the terminal device 400 does not blindly detect the second PDCCH, the communicating unit 410 is further configured to: retransmit the first message to the network device.

In an embodiment, if the terminal device determines to blindly detect the second PDCCH, the processing unit 420 is specifically configured to: blindly detect the second PDCCH by using a second target RNTI.

In an embodiment, the processing unit 420 is specifically configured to: determine that the contention conflict in the random access procedure is resolved if the terminal device 400 blindly detects the second PDCCH and the first identifier successfully matches with the second identifier, where the second identifier is a conflict resolution identifier carried in the second PDCCH, or the second identifier is a conflict resolution identifier carried in the PDSCH scheduled by the second PDCCH.

In an embodiment, the second target RNTI is a cell-radio network temporary identifier C-RNTI or a temporary cell-radio network temporary identifier TC-RNTI.

In an embodiment, the second PDCCH is used to instruct the parameters used by the terminal device 400 for data transmission after the terminal device 400 resolves the contention conflict.

In an embodiment, the parameters used by the terminal device 400 for data transmission include parameters in the RAR sent by the network device aiming at the first message.

In an embodiment, the first PDSCH include medium access control MAC protocol data unit PDU, where the MAC PDU at least include DL resource assignment instruction information, the DL resource assignment instruction information is used to instruct the terminal device to receive time-frequency resource of the second PDSCH.

In an embodiment, the processing unit 420 is specifically configured to: determine that the contention conflict in the random access procedure is resolved if the first identifier successfully matches with a fourth identifier, where the fourth identifier is a conflict resolution identifier carried by the first PDCCH or the first PDSCH.

In an embodiment, the MAC PDU includes fifth instruction information, where the fifth instruction information is used to instruct whether the MAC PDU included in the first PDSCH includes the DL resource assignment instruction information.

In an embodiment, a bit position of a bit in the fifth instruction information is equal to a position of a preserved bit in a RAR in a four-step random access.

In an embodiment, where the first identifier includes at least one of the following: a random number, 5G-service temporary mobile subscriber identifier 5G-S-TMSI, identifier-radio network temporary identifier I-RNTI, short identifier-radio network temporary identifier Short I-RNTI.

It should be understood that, the terminal device 400 can correspond to the terminal device in method 300, and can implement corresponding operations of the terminal device in the method 300, and for brevity, it will not be repeated herein.

FIG. 12 shows a schematic block diagram of a network device 500 of an embodiment of the present application. As shown in FIG. 12, the network device 500 includes:

a communicating unit 510, configured to receive a first message sent by a terminal device, where the first message includes a random access preamble and UL message, and the UL message includes a first identifier;

a processing unit 520, configured to decode the first message.

The processing unit 520 is further configured to determine a response message to be sent to the terminal device according to a decoding situation of the first message.

In an embodiment, the communicating unit 510 is further configured to: send a first physical downlink control channel PDCCH scrambled by a first target radio network temporary identifier RNTI to the terminal device if the random access preamble is decoded successfully and the first identifier is decoded successfully.

In an embodiment, the first identifier is cell-radio network temporary identifier C-RNTI, and the first target RNTI is C-RNTI.

In an embodiment, the first identifier is other identifier other than the C-RNTI, and the first target RNTI is RA-RNTI.

In an embodiment, the communicating unit 510 is specifically configured to: send the first PDCCH and the second PDCCH scrambled by a second target RNTI to the terminal device.

In an embodiment, the first instruction information is used to instruct the terminal device whether to blindly detect the second PDCCH, where information scheduled by the first PDCCH includes the first instruction information, or PDSCH scheduled by the first PDCCH includes the first instruction information.

In an embodiment, if a value of at least one bit in the first instruction information is a first value, the first instruction information is used to instruct the terminal device to blindly detect the second PDCCH.

In an embodiment, if a value of at least one bit in the first instruction information is a second value, the first instruction information is used to instruct the terminal device not to blindly detect the second PDCCH.

In an embodiment, the first instruction information is random access response RAR.

In an embodiment, a bit position of at least one bit in the RAR is equal to a bit position of a preserved bit in a four-step random access.

In an embodiment, if the first instruction information is used to instruct the terminal device not to detect the second PDCCH, the communicating unit 510 is further configured to: receive a message 3 in the four-step random access sent by the terminal device; send a message 4 to the terminal device aiming at the message 3.

In an embodiment, if the first instruction information is used to instruct the terminal device not to detect the second PDCCH, the communicating unit 510 is further configured to: receive the first message retransmitted by the terminal device.

In an embodiment, the second PDCCH is used to instruct parameters used by the terminal device for data transmission when the terminal device determines that the contention conflict in the random access procedure is resolved.

In an embodiment, the parameters used by the terminal device for data transmission include parameters in the information scheduled by the first PDCCH.

In an embodiment, the second target RNTI is cell-radio network temporary identifier C-RNTI or temporary cell-radio network temporary identifier TC-RNTI.

In an embodiment, the RA-RNTI is determined according to a position of a physical random access channel PRACH resource for receiving the random access preamble, and/or, a position of a physical uplink shared channel PUSCH resource for receiving the UL message.

In an embodiment, the first physical downlink shared channel PDSCH scheduled by the first PDCCH includes medium access control MAC protocol data unit PDU, where the MAC PDU at least include downlink resource assignment instruction information, and the downlink resource assignment instruction information is used to instruct the terminal device to receive a time-frequency resource of the second PDSCH.

In an embodiment, the MAC PDU includes fifth instruction information, where the fifth instruction information is used to instruct whether the MAC PDU included in the first PDSCH includes the DL resource assignment instruction information.

In an embodiment, a bit position of a bit in the fifth instruction information is equal to a position of a preserved bit in a RAR in a four-step random access.

In an embodiment, the first identifier includes at least one of the following: a random number, 5G-S-temporary mobile subscriber identifier TMSI, I-RNTI, Short I-RNTI.

In an embodiment, the communicating unit 510 is further configured to: if the random access preamble is successfully decoded and the first identifier fails to be decoded, send a message 2 in the four-step random access to the terminal device; or send second instruction information to the terminal device, where the second instruction information is used to instruct the terminal device to retransmit the first message.

It should be understood that, the network device 500 can correspond to the network device in method 300, and can implement corresponding operations of the network device in the method 300, and for brevity, it will not be repeated herein.

Figure 13:
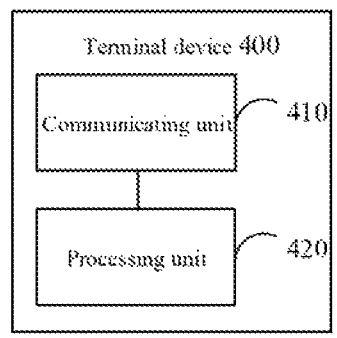
FIG. 13 is a schematic block diagram of a terminal device according to an embodiment of the present application.

FIG. 13 is a schematic structural diagram of a communication device 600 provided by an embodiment of the present application. The communication device 600 shown in FIG. 13 includes a processor 610, where the processor 610 can call and run a computer program from a memory, to implement the method in the embodiment of the present application.

In an embodiment, as shown in FIG. 13, the communication device 600 may further include a memory 620. Where, the processor 610 can call and run a computer program from the memory 620, to implement the method in the embodiment of the present application.

Where, the memory 620 can be a single device separate from the processor 610, or can be integrated in the processor 610.

In an embodiment, as shown in FIG. 13, the communication device 600 can further include a transceiver 630, and the processor 610 can also control the transceiver 630 to communicate with other devices, specifically, can send information or data to other devices, or receive information or data sent by other devices.

Where, the transceiver 630 may include a transmitter and a receiver. The transceiver 630 may further include an antenna, and a number of the antenna may be one or more.

In an embodiment, the communication device 60 can specifically be a network device, and the communication device 600 can implement corresponding procedures implemented by the network device in the respective methods of the embodiment of the present application, which will not be repeated herein for brevity.

In an embodiment, the communication device 600 can specifically be a terminal device, and the communication device 600 can implement corresponding procedures implemented by the terminal device in the respective methods of the embodiment of the present application, which will not be repeated herein for brevity.

Figure 14:
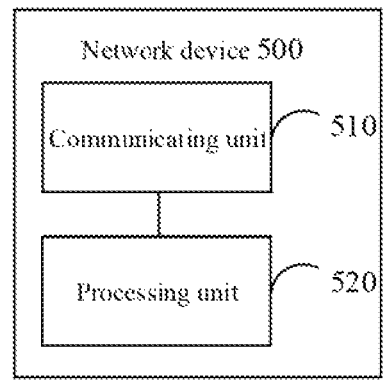
FIG. 14 is a schematic block diagram of a network device according to an embodiment of the present application.

FIG. 14 is a schematic structural diagram of a chip of the embodiment of the present application. The chip 700 shown in FIG. 14 includes a processor 710, where the processor 710 can call and run a computer program from a memory to implement the method in the embodiment of the present application.

In an embodiment, as shown in FIG. 14, the chip 700 can also include a memory 720. Where, the processor 710 can call and run a computer program from the memory 720, to implement the method in the embodiment of the present application.

Where, the memory 720 can be a single device separate from the processor 710, or can be integrated in the processor 710.

In an embodiment, the chip 700 can also include an input interface 730. Where, the processor 710 can control the input interface 730 to communicate with other devices or chips, specifically, can acquire information or data sent by other devices or chips.

In an embodiment, the chip 700 can also include an output interface 740. Where, the processor 710 can control the output interface 740 to communicate with other devices or chips, specifically, can output information or data to other devices or chips.

In an embodiment, the chip can be applied to a terminal device, and the chip can implement corresponding procedures implemented by the terminal device in the respective methods of the embodiment of the present application, which will not be repeated herein for brevity.

In an embodiment, the chip can be applied to a network device, and the chip can implement corresponding procedures implemented by the network device in the respective methods of the embodiment of the present application, which will not be repeated herein for brevity.

It should be understood that, the chip mentioned in the embodiment of the present application can also be called a system-level chip, a system chip, a chip system, or an on-chip system chip, etc.

It should be understood that, the processor of the embodiment of the present application can be an integrated circuit chip, having the capability of signal processing. In an implementation process, respective steps in the above method embodiments can be completed through an integrated logic circuit of hardware or an instruction in the form of software in the processor. The above processor can be a general processor, a digital signal processor (DSP), application specific integrated circuit (ASIC), a field programmable gate array (FPGA) or other programmable logic elements, discrete gate or transistor logic devices, discrete hardware components. Respective methods, steps and logic block diagrams disclosed in the embodiment of the present application can be implemented or executed. The general processor can be a microprocessor, or the processor can be any conventional processor, etc. The steps of the methods disclosed with reference to the embodiments of the present application can be directly embodied as being executed and completed by a hardware decoding processor, or being executed and complete by using a combination of hardware and software modules in a decoding processor. The software module can be located in mature storage medium in the art such as a random memory, a flash, a read-only memory, a programmable read-only memory or an electrically erasable programmable read-only memory, a register and so on. The storage medium is located in a memory, and the processor reads information in the memory, and completes the steps of the above methods in combination with its hardware.

It can be understood that, the memory in the embodiment of the present application can be a volatile memory or a non-volatile memory, or can include both a volatile memory and a non-volatile memory. Where, the non-volatile memory can be a read-only memory (ROM), a programmable read-only memory (PROM), an erasable programmable read-only memory (EPROM), an electrically erasable programmable read-only memory (EEPROM) or a flash. The volatile memory can be a random access memory (RAM), which is used as an external high-speed cache. Through illustrative but not limited description, various forms of RAM are available, for example a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be understood that, the memory of the system and the method described herein intends to include, but are not limited to, these and any other suitable type of memory.

It should be understood that the above-mentioned memory is an illustrative but not limited description, for example, the memory in the embodiment of the present application can also be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synch link dynamic random access memory (SLDRAM), and direct rambus random access memory (DR RAM) and so on. That is, the memory in the embodiment of the present application intends to include, but is not limited to, these and any other memory of suitable types.

Figure 15:
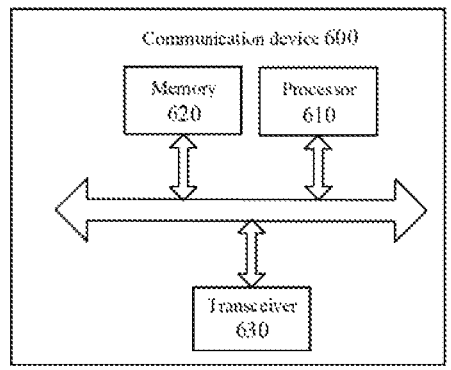
FIG. 15 is a schematic block diagram of a communication device according to an embodiment of the present application.
Figure 16:
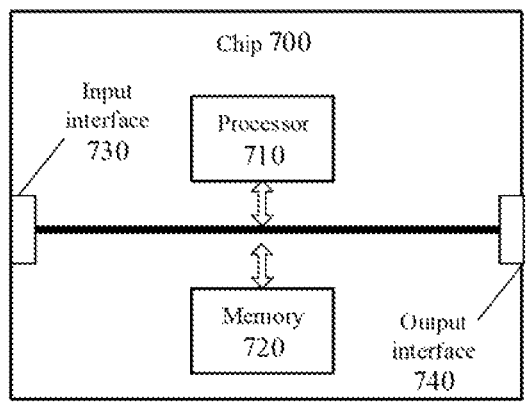
FIG. 16 is a schematic block diagram of a chip according to an embodiment of the present application.
Figure 17:
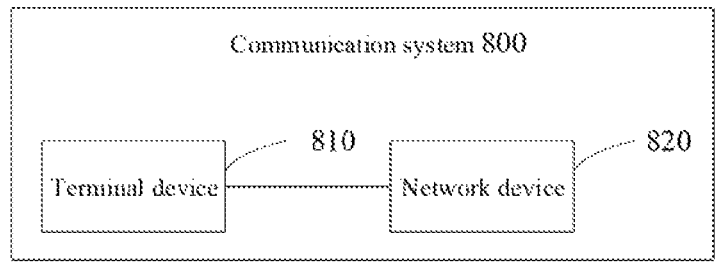
FIG. 17 is a schematic block diagram of a communication system according to an embodiment of the present application.

FIG. 15 is a schematic block diagram of a communication system 800 provided by an embodiment of the present application. As shown in FIG. 15, the communication system 800 includes a terminal device 810 and a network device 820.

Where, the terminal device 810 can be configured to implement corresponding functions implemented by the terminal device in the above methods, and the network device 820 can be configured to implement corresponding functions implemented by the network device in the above methods, which will not be repeated herein for brevity.

The embodiment of the present application further provides a computer-readable storage medium, configured to store a computer program.

In an embodiment, the computer-readable storage medium can be applied to a terminal device, and the computer program causes a computer to execute corresponding procedures implemented by the terminal device in the respective methods of the embodiment of the present application, which will not be repeated herein for brevity.

In an embodiment, the computer-readable storage medium can be applied to a network device, and the computer program causes a computer to execute corresponding procedures implemented by the network device in the respective methods of the embodiment of the present application, which will not be repeated herein for brevity.

The embodiment of the present application further provides a computer program product, including computer program instructions.

In an embodiment, the computer program product can be applied to a terminal device, and the computer program instructions cause a computer to execute corresponding procedures implemented by the terminal device in the respective methods of the embodiment of the present application, which will not be repeated herein for brevity.

In an embodiment, the computer program product can be applied to a network device, and the computer program instructions cause a computer to execute corresponding procedures implemented by the network device in the respective methods of the embodiment of the present application, which will not be repeated herein for brevity.

The embodiment of the present application further provides a computer program.

In an embodiment, the computer program can be applied to a terminal device, when the computer program runs on a computer, causing the computer to execute corresponding procedures implemented by the terminal device in the respective methods of the embodiment of the present application, which will not be repeated herein for brevity.

In an embodiment, the computer program can be applied to a network device, when the computer program runs on a computer, causing the computer to execute corresponding procedures implemented by the network device in the respective methods of the embodiment of the present application, which will not be repeated herein for brevity.

Those of ordinary skills in the an may note that, units and algorithm steps of the respective examples described with reference to the embodiment disclosed herein can be implemented by electronic hardware or a combination of electronic computer software and electronic hardware. Whether these functions are executed in the method of hardware or software depends on specific application and designed restriction condition of the technical solution. Those of specific skills can use different methods to implement the described functions for each specific application, but such implementation should not be considered beyond the scope of the present application.

Those of skills in the art should clearly note that, for brevity and convenience of description, specific working process of the above-mentioned systems, apparatuses and units can refer to the corresponding procedures in the above-mentioned method embodiments, and will not be repeated herein.

In several embodiments provided in the present application, it should be understood that the disclosed systems, apparatuses and methods can be implemented in other ways. For example, the apparatus embodiments described above are only illustrative, for example, the division of units is only a division of logic functions, and there can be other division method in practical implementation, for example, multiple units or components can be combined together or can be integrated into another system, or some features can be omitted or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the components displayed as units may or may not be physical units, that is, they may be located in one place or distributed to multiple network units. Part of or all of the units can be selected according to practical need to implement the purpose of the solution of the present embodiment.

In addition, respective functional units in the respective embodiments of the present application can be integrated into one processing unit, or respective units physically exist alone, or two or more units are integrated into one unit.

If being implemented in a form of software function unit and sold or used as independent products, the functions can be stored in a computer-readable storage medium. Based on this understanding, the essential or the contribution part to the prior art of technical solution of the present application or the part of the technical solution can be embodied in the form of a software product, which is stored in a storage medium and includes several instructions to cause a computer device (which can be a personal computer, a server, or a network device, etc.) to execute all or part of the steps of the method described in respective embodiments of the present application. The above-mentioned storage medium includes: a U disk, a mobile hard disk, a read-only memory (ROM), a random access memory (RAM), a magnetic disk or an optical disk, and other media that can store program codes.

The above is only a specific embodiment of the present application, but the protection scope of the present application is not limited to this, any skilled person familiar with the present technical field can easily think of changes or substitutions within the technical scope disclosed in the present application, which should all be covered within the protection scope of the present application. Thus, the protection scope of the present application shall be subject to the protection scope of the claims.

What is claimed is:

1. A random access method, wherein the method comprises:
   sending, by a terminal device, a first message to a network device, wherein the first message comprises a random access preamble and an uplink (UL) message, and the UL message comprises a first identifier;
   if the terminal device is in connected, determining, by the terminal device, the first identifier as a cell-radio network temporary identifier, C-RNTI, and determining a first target radio network temporary identifier, RNTI, as the C-RNTI used for blindly detecting a first physical downlink control channel, PDCCH, according to the first. identifier; and if the terminal device is in idle or inactive, determining, by the terminal device, the first identifier as other identifier other than the C-RNTI, and determining the first target RNTI as a random access radio network temporary identifier, RA-RNTI, used for blindly detecting the first PDCCH according to the first identifier:
   blindly detecting, by the terminal device, the first PDCCH according to the first target RNTI;
   determining, by the terminal device, whether a contention conflict in a random access procedure is resolved according to a blind detection result of the first PDCCH or a first physical downlink shared channel (PDSCH) scheduled bye the first PDCCH.

2. The method according to claim 1, wherein the method further comprises:
   starting, by the terminal device, a first tinier or opening a first window after the terminal device sends the first message to the network device;
   the blindly detecting, by the terminal device, the first PDCCH according to the first target RNTI comprises:
   blindly detecting, by the terminal device, the first PDCCH according to the first target RNTI within a duration range of the first timer or the first window.

3. The method according to claim 1, wherein when the first identifier is the C-RNTI and the first target RNTI is the C-RNTI,
   the determining, by the terminal device, whether a contention conflict in a random access procedure is resolved according to a blind detection result of the first PDCCH or a first PDSCH scheduled by the first PDCCH comprises:
   determining, by the terminal device, that the contention conflict in the random access procedure is resolved if the first PDCCH is blindly detected by the terminal device;
   determining, by the terminal device, that the contention conflict in the random access procedure is not resolved if the first PDCCH is not blindly detected by the terminal device.

4. The method according to claim 1, wherein when the first identifier is the other identifier other the C-RNTI and the first target RNTI is the RA-RNTI),
   the RA-RNTI is determined according to at least one of a position of a physical random access channel (PRACH) resource for transmitting the random access preamble, or a position of a physical uplink shared channel (PUSCH) resource for transmitting the UL message.

5. The method according to claim 4, wherein the determining, by the terminal device, whether a contention conflict in a random access procedure is resolved according to a blind detection result of the first PDCCH or a first physical downlink shared channel PDSCH scheduled by the first PDCCH comprises:
   determining, by the terminal device, whether to blindly detect a second PDCCH according to the blind detection result of the first PDCCH;
   blindly detecting, by the terminal device, the second PDCCH if the terminal device determines to blindly detect the second PDCCH;
   determining, by the terminal device, whether the contention conflict in the random access procedure is resolved according to a blind detection result of the second PDCCH.

6. The method according to claim 5, wherein the determining, by the terminal device, whether to blindly detect the second PDCCH according to the blind detection result of the first PDCCH comprises:
   determining, by the terminal device, whether to blindly detect the second PDCCH according to first instruction information if the first PDCCH is blindly detected by the terminal device, wherein the first PDCCH comprises the first instruction information, or the first PDSCH scheduled by the first PDCCH comprises the first instruction information;
   if a value of at least one bit in the first instruction information is a first value, the first instruction information is used to instruct the terminal device to blindly detect the second PDCCH; and
   if a value of at least one bit in the first instruction information is a second value, the first instruction information is used to instruct the terminal device not to blindly detect the second PDCCH.

7. The method according to claim 6, wherein the determining, by the terminal device, whether to blindly detect the second PDCCH according to first instruction information comprises:
   determining, by the terminal device, to blindly detect the second PDCCH if the first instruction information is used to instruct the terminal device to blindly detect the second PDCCH;
   determining, by the terminal device, not to blindly detect the second PDCCH if the first instruction information is used to instruct the terminal device not to blindly detect the second PDCCH.

8. The method according to claim 6, wherein the first instruction information is comprised in a random access response (RAR), and a bit position of at least one bit in the RAR is equal to a bit position of a preserved bit in a four-step random access.

9. The method according to claim 5, Wherein if the terminal device does not blindly detect the second PDCCH, the method further comprises:
   sending, by the terminal device, a message 3 in a four-step random access to the network device:
   receiving, by the terminal device, a message 4 sent by the network device aiming at the message 3;
   determining, by the terminal device, whether the contention conflict in the random access procedure is resolved according to the message 4.

10. The method according to claim 5, wherein if the terminal device does not blindly detect the second PDCCH, the method further comprises:
   retransmitting, by the terminal device, the first message to the network device.

11. The method according to claim 5, wherein if the terminal device determines to blindly detect the second PDCCH, the blindly detecting, by the terminal device, the second PDCCH comprises:
blindly detecting, by the terminal device, the second PDCCH by using a second target RNTI; and
wherein the determining, by the terminal device, whether the contention conflict in the random access procedure is resolved according to a blind detection result of the second PDCCH comprises:
determining, by the terminal device, that the contention conflict in the random access procedure is resolved if the second PDCCH is detected by the terminal device and the first identifier successfully matches with a second identifier, wherein the second identifier is a conflict resolution identifier carried by the second PDCCH, or the second identifier is a conflict resolution identifier carried by a second PDSCH scheduled by the second PDCCH.

12. The method according to claim 11, wherein the second target RNTI is the C-RNTI or a temporary cell-radio network temporary identifier (TC-RNTI).

13. The method according to claim 5, wherein the second PDCCH is used to instruct parameters used by the terminal device for data transmission after the terminal device resolves the contention conflict; and
wherein the parameters used by the terminal device for data transmission comprises parameters in a random access response (RAR) sent by the network device aiming at the first message.

14. The method according to claim 4, wherein the first PDSCH comprises a medium access control (MAC) protocol data unit (PDU), the MAC PDU at least comprises downlink (DL) resource assignment instruction information, and the DL resource assignment instruction information is used to instruct the terminal device to receive a time-frequency resource of a second PDSCH; and
wherein the determining, by the terminal device, whether a contention conflict in a random access procedure is resolved according to a blind detection result of the first PDCCH or a first physical downlink shared channel (PDSCH) scheduled by the first PDCCH comprises:
determining, by the terminal device, that the contention conflict in the random access procedure is resolved if the first identifier successfully matches with a fourth identifier, wherein the fourth identifier is a conflict resolution identifier carried by the first PDCCH or the first PDSCH.

15. The method according to claim 14, wherein the MAC PDU comprises fifth instruction information, and the fifth instruction information is used to instruct whether the MAC PDU comprised in the first PDSCH comprises the DL resource assignment instruction information.

16. The method according to claim 15, wherein a bit position of a bit in the fifth instruction information is equal to a position of a preserved bit in a random access response (RAR) in a fourth-step random access.

17. The method according to claim 4, wherein the other identifier other than the C-RNTI comprises at least one of the following: a random number, a 5G-service temporary mobile subscriber identifier (5G-S-TMSI), an identifier radio network temporary identifier (I-RNTI), a short identifier radio network temporary identifier Short (I-RNTI).

18. A random access method, wherein the method comprises:
receiving, by a network device, a first message sent by a terminal device, wherein the first message comprises a random access preamble and an uplink (UL) message, and the UL message comprises a first identifier;
decoding, by the network device, the first message;
determining, by the network device, a response message to be sent to the terminal device according to a decoding situation of the first message;
wherein the determining, by the network device, a response :message to be sent to the terminal device according to a decoding situation of the first message comprises:
sending by the network device a first physical downlink control channel, PDCCH, scrambled by a first target radio network temporary identifier, RNTI, to the terminal device if the random access preamble is decoded successfully and the first identifier is decoded successfully, wherein
if the terminal device is in connected, the first identifier is a cell-radio network temporary identifier, C-RNTI, and the first target RNTI is the C-RNTI;
if the terminal device is in idle or inactive, the first identifier is other identifier other than the C-RNTI, and the first target RNTI is a random access radio network temporary identifier, RA-RNTI.

19. A terminal device, comprising:
a processor, a memory and a transceiver, wherein the memory is configured to store a computer program, and the processor is configured to call and run the computer program stored in the memory to:
control the transceiver to send a first message to a network device, wherein the first message comprises a random access preamble and an uplink (UL) message, and the UL message contains a first identifier;
if the terminal device is in connected, determining the first identifier as a cell-radio network temporary identifier, C-RNTI, and determining a first target radio network temporary identifier, RNTI, as the C-RNTI used for blindly detecting a first physical downlink control channel, PDCCH, according to the first identifier; and
if the terminal device is in idle or inactive, determining the first identifier as other identifier other than the C-RNTI, and determining the first target RNTI as a random access radio network temporary identifier, RA-RNTI, used for blindly detecting the first PDCCH according to the first identifier;
blindly detect the first PDCCH according to the first target radio network temporary identifier (RNTI);
determine whether a contention conflict in a random access procedure is resolved according to a blind detection result of the first PDCCH or a first physical downlink shared channel (PDSCH) scheduled by the first PDCCH.

20. A non-transitory computer-readable storage medium, configured to store a computer program, wherein the computer program causes a computer to execute the method according to claim 1.

* * * * *